United States Patent
Watanabe et al.

(10) Patent No.: US 6,346,338 B1
(45) Date of Patent: *Feb. 12, 2002

(54) COMBINATION MAGNETORESISTIVE/ INDUCTIVE THIN FILM MAGNETIC HEAD AND ITS MANUFACTURING METHOD

(75) Inventors: Toshinori Watanabe; Akira Takahashi; Fumihito Koike; Nobuhiro Hayashi; Yoshihiro Kanada; Kiyoshi Kobayashi; Kiyoshi Sato; Eiji Umetsu; Takashi Hatanai; Akihiro Makino, all of Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/685,435

(22) Filed: Oct. 10, 2000

Related U.S. Application Data

(63) Continuation of application No. 09/429,129, filed on Oct. 28, 1999, now Pat. No. 6,210,543, which is a continuation of application No. 09/016,838, filed on Jan. 30, 1998, now Pat. No. 6,150,046.

(30) Foreign Application Priority Data

Jan. 31, 1997 (JP) ............................................. 9-019264
Feb. 19, 1997 (JP) ............................................. 9-034563

(51) Int. Cl.$^7$ .......................... G11B 5/39; G11B 5/127
(52) U.S. Cl. ...................... 428/692; 428/627; 428/629; 428/639; 428/668; 428/693; 360/317
(58) Field of Search ................................. 428/611, 627, 428/628, 629, 633, 668, 692, 900, 694 TR, 694 TM, 694 T, 694 R, 639, 693; 360/317–319

(56) References Cited

U.S. PATENT DOCUMENTS

| | | |
|---|---|---|
| 3,354,059 A | 11/1967 | Koretzky |
| 4,661,216 A | 4/1987 | Anderson et al. |
| 4,735,865 A | 4/1988 | Nago et al. |
| 4,743,313 A | 5/1988 | Makino et al. |
| 4,762,755 A | 8/1988 | Kumasaka et al. |
| 4,858,049 A | 8/1989 | Kobayashi et al. |
| 4,935,314 A | 6/1990 | Kobayashi et al. |
| 4,943,883 A | 7/1990 | Sano et al. |
| 5,264,981 A | 11/1993 | Lo |
| 5,549,978 A | 8/1996 | Iwasaki et al. |
| 5,573,863 A | 11/1996 | Hayakawa et al. |
| 5,576,098 A | 11/1996 | Fumoto et al. |
| 5,609,971 A | 3/1997 | Noguchi et al. |
| 5,894,388 A | 4/1999 | Sato et al. |
| 6,150,046 A | * 11/2000 | Watanabe et al. ........ 428/694 R |

* cited by examiner

Primary Examiner—Stevan A. Resan
Assistant Examiner—Kevin M. Bernatz
(74) Attorney, Agent, or Firm—Brinks Hofer Gilson & Lione

(57) ABSTRACT

A thin film magnetic head includes an upper core layer and a lower core layer which are made of an Fe—M—O alloy, an Fe—M—T—O alloy or an NI—Fe—X alloy so that the upper core layer has a high saturation magnetic flux density, low coercive force and high resistivity, and the lower core layer has a lower saturation magnetic flux density than the upper core layer, low coercive force, high resistivity, and a low magnetostriction constant. Also the lower core layer is formed so that the thickness gradually decreases toward both side ends, and a gap layer can be formed on the lower core layer to have a uniform thickness. Since the lower core layer is formed by sputtering, a material having excellent soft magnetic material can be used, thereby enabling recording at high frequency.

16 Claims, 13 Drawing Sheets

COMBINATION MAGNETORESISTIVE/ INDUCTIVE THIN FILM MAGNETIC HEAD AND ITS MANUFACTURING METHOD

This is a continuation of application Ser. No. 09/429,129, filed Oct. 28, 1999, now U.S. Pat. No. 6,210,543, which is a continuation of application Ser. No. 09/016,838, filed Jan. 30, 1998, now U.S. Pat. No. 6,150,046.

BACKGROUND OF THE INVENTION

1. Field of the Invention

The present invention relates to a combination MR (magnetoresistive)/inductive thin film magnetic head carried on, for example, a hard disk drive, and particularly to a thin film magnetic head in which materials of an upper core layer and a lower core layer are improved to improve magnetic characteristics, and a manufacturing method thereof.

2. Description of the Related Art

FIG. 15 is an enlarged sectional view showing a conventional thin film magnetic head as viewed from the side thereof opposite to a recording medium.

This thin film magnetic head comprises a reading head h1 which employs the magnetoresistive effect and a writing inductive head h2, which are laminated on the trailing-side end surface of a slider which constitutes, for example, a floating head.

The reading head h1 comprises a lower shielding layer 1 made of sendust, an Ni—Fe alloy (permalloy) or the like, a lower gap layer 2 made of a non-magnetic material such as $Al_2O_3$ (aluminum oxide) or the like and formed on the lower shielding layer 1, and a magnetoresistive element 3 deposited on the lower gap layer 2. The magnetoresistive element 3 comprises three layers including a soft adjacent layer (SAL), a non-magnetic layer (SHUNT layer), and a magnetoresistive layer (MR layer) which are laminated in turn. Generally, the magnetoresistive layer comprises an Ni—Fe alloy (permalloy) layer, the non-magnetic layer comprises a tantalum layer, and the soft adjacent layer comprises an Ni—Fe—Nb alloy layer.

On both sides of the magnetoresistive layer 3 are formed hard bias layers serving as longitudinal bias layers. On the hard bias layers are formed main lead layers 5 made of a non-magnetic conductive material having low electric resistance, such as Cu (copper), W (tungsten) or the like. On the main lead layers 5 is further formed an upper gap layer 6 made of a non-magnetic material such as aluminum oxide or the like.

On the upper gap layer 6 is formed a lower core layer 20 by plating permalloy. In the inductive head h2, the lower core layer 20 functions as a leading-side core portion which gives a recording magnetic field to a recording medium. In the reading head h1, the lower core layer 20 functions as an upper shielding layer, and a gap length G11 is determined by the gap between the lower shielding layer 1 and the lower core layer 20.

On the lower core layer 20 are laminated a gap layer (non-magnetic material layer) 8 made of aluminum oxide or the like, and an insulation layer (not shown in the drawing) made of polyimide or a resist material, and a coil layer 9 patterned to a spiral form is provided on the insulation layer. The coil layer 9 is made of a non-magnetic conductive material having low electric resistance, such as Cu (copper) or the like. The coil layer 9 is surrounded by an insulation layer (not shown) made of polyimide or a resist material, and an upper core layer 21 made of a magnetic material such as permalloy is formed on the insulation layer by plating. The upper core layer 21 functions as the trailing-side core portion of the inductive head h2 which gives a recording magnetic field to the recording medium.

As shown in FIG. 15, on the side opposite to the recording medium, the tip 21a of the upper core layer 21 is opposed to the upper side of the lower core layer 20 with the gap layer 8 therebetween to form a magnetic gap having a magnetic gap length G12 which gives a magnetic field to the recording medium. On the upper core layer 21 is provided a protective layer 11 made of aluminum oxide or the like.

In the inductive head h2, when a recording current is supplied to the coil layer 9, a recording magnetic field is applied to the upper core layer 21 and the lower core layer 20 from the coil layer 9. In the magnetic gap, magnetic signals are recorded on the recording medium such as a hard disk by a leakage magnetic field between the lower core layer 20 and the upper core layer 21.

FIG. 16 is an enlarged sectional view showing a conventional method of producing the lower core layer 20.

As shown in FIG. 16A, a base layer 22 made of a magnetic material such as permalloy or the like is formed on the upper gap layer 6 by plating. On the base layer 22 is coated a resist solution, followed by exposure to form rectangular resist layers 23 on the base layer 22. In FIG. 16B, magnetic material layers 20 and 24 made of permalloy or the like are formed, by plating, on portions of the base layer 22 where the resist layers 23 are not formed. The magnetic material layer 20 formed between the resist layers 23 is left behind as the lower core layer.

In FIG. 16C, the resist layers 23 are removed, and portions of the base layer 22 which are formed below the resist layers 23 are removed by ion milling. In FIG. 16D, a protective layer 25 made of a resist material is formed on the portions on the upper gap layer 6 where the resist layers 23 were removed, to cover the magnetic material layer 20. In FIG. 16E, the magnetic material layers 24 and portions of the base layer 22 which are formed directly below the magnetic material layers 24 are removed by wet etching. In FIG. 16F, the protective layer 25 is removed to leave only the rectangular lower core layer 20 on the upper gap layer 6 with the base layer 22 therebetween.

The conventional thin film magnetic head shown in FIG. 15 comprises the lower core layer 20 formed by plating permalloy and thus has the following problems.

(i) Since the lower core layer 20 (the upper shielding layer) is thick and has a substantially rectangular sectional shape, step portions A each having a corner are formed at both side ends of the lower core layer 20. Therefore, it is difficult to form the gap layer 8 having a uniform thickness on the lower core layer 20. Particularly, the thickness of the gap layer 8 is extremely small near the corners of the step portions A at both side ends of the lower core layer 20, and thus an insulation failure easily occurs between the lower core layer 20 and the coil layer 9.

Also, in order to increase the recording density, it is necessary to thin the gap layer 8 to decrease the gap length G12 of the magnetic gap. However, when the gap layer is thinned, pin holes easily occur in the gap layer 8 near the step portions A.

(ii) Since the lower core layer 20 (the upper shielding layer) has a rectangular sectional shape, and the step portions A are formed at both side ends thereof, a difference in height is also formed in the surface of the gap layer 8 formed on the step portions A. Therefore, when the area of the lower core layer 20 is smaller than the region of the coil layer 9, the coil layer 9 is formed on the step portions of the gap layer 8, thereby making it difficult to form the coil layer 9 and easily causing defects in the coil layer 9.

(iii) In order to increase the recording density of signals on the recording medium, and increase the magnetic writing frequency, it is necessary to improve the soft magnetic characteristics of the lower core layer 20 and the upper core layer 21 to impart low coercive force and high resistivity thereto. Although the saturation magnetic flux density is preferably as high as possible, particularly when the saturation magnetic flux density of the lower core layer 20 is lower than that of the upper core layer 21 so that magnetization of a leakage magnetic field between the lower core layer 20 and the upper core layer 21 is easily reversed, the density of signal writing on the recording medium can possibly be increased.

In the thin film magnetic head shown in FIG. 15, since the lower core layer 20 functions not only as a leading-side core portion for the inductive head h2 but also as an upper shielding layer for the reading head h1, the lower core layer 20 must be provided with both the properties as a core and the properties as a shield.

In order to improve the shielding function of the lower core layer 20, the direction (the direction perpendicular to the drawing of FIG. 15) of an external magnetic field applied from the recording medium is preferably the direction of the hard axis of magnetization, the saturation magnetic flux density is not excessively high, and the lower core layer 20 preferably has low coercive force and a low magnetostriction constant in order to prevent excessive increase in the saturation magnetic flux density.

Also, in order to further increase the density of signal recording on the recording medium, it is necessary to improve the soft magnetic characteristics of the lower core layer 20 and the upper core layer 21, and decrease the gap length G12 of the magnetic gap in the inductive head h2. Therefore, the non-magnetic material layer 8 is formed to be as thin as possible.

Further, in the reading head h1, in order to improve the resolution of the leakage magnetic field from the recording medium subjected to high-density recording, it is necessary to decrease the gap length G11 of the magnetic gap. Therefore, the lower gap layer 2 and the upper gap layer 6 are formed to be as thin as possible.

However, even if the magnetic gap is decreased, when the shielding function of the lower core layer 20 deteriorates, the MR layer of the magnetoresistive element layer 3 cannot be shielded from recording noise of the recording medium and thus captures excess signals, thereby causing the problem of easily producing Barkhausen noise.

As described above, the lower core layer 20 having both the leading-side core function for the inductive head h2 and the upper shielding function for the reading head h1 is preferably made of a soft magnetic material having a lower saturation magnetic flux density than the upper core layer 21, low coercive force, high resistivity and a low magnetostriction constant.

However, permalloy which forms the conventional lower core layer 20 and upper core layer 21 has a relatively high saturation magnetic flux density of 1.0 T (tesla) and coercive force of as low as 0.5 Oe (oersted) in the direction of hard axis, but has a resistivity of as low as 30 ($\mu\Omega$·cm). Therefore, when the recording frequency is further increased, an eddy current occurs in the lower core layer 20 and the upper core layer 21, and thus a heat loss due to the eddy current is increased. Also the magnetic permeability in a high frequency region deteriorates, thereby deteriorating the shielding function and easily producing Barkhausen noise in the MR layer.

U.S. Pat. No. 5,573,863 discloses s soft magnetic material comprising a mixture of a bcc-structure Fe fine crystalline phase and an amorphous phase containing an element selected from the rare earth elements, Ti, Zr, Hf, V, Nb, Ta and W, and O. The composition ratios of the soft magnetic material can be appropriately adjusted to obtain a high saturation magnetic flux density, low coercive force and high resistivity. Therefore, the use of the soft magnetic material for the lower core layer 20 and the upper core layer 21 enables manufacture of a thin film magnetic head having excellent magnetic characteristics.

With this soft magnetic material, a film cannot be formed by plating, but can be formed only by a sputtering method or an evaporation method. However, a conventional method of manufacturing a thin film magnetic head is difficult to form the lower core layer 20 by the sputtering method or evaporation method. The reasons for this will be described below.

When the lower core layer 20 is formed by the sputtering method, a layer of the soft magnetic material is formed directly on the upper gap layer 6 made of aluminum oxide or the like. However, in order to form the soft magnetic material layer in a predetermined shape, unnecessary portions must be removed by ion milling (dry etching). However, ion milling for removing the soft magnetic material layer causes the problem of damaging the upper gap layer 6 made of aluminum oxide formed below the soft magnetic material layer.

Although the upper gap layer is formed to a thickness of about 1000 angstroms, the lower core layer is formed to a larger thickness than the upper gap layer. It is generally thought that ion milling for removing a predetermined thickness causes a tolerance of about 5% for a thickness which can be removed. Therefore, ion milling for removing a predetermined portion of the lower core layer makes the thin upper gap layer formed below the lower core layer easy to damage due to the tolerance of about 5% for the thickness removed.

For the above described reasons, the lower core layer 20 is removed by ion milling, and at the same time, the upper gap layer 6 is partly removed. In the worst case, the entire upper gap layer 6 is removed, and thus the main lead layer 5 formed below the upper gap layer 6 is affected by ion milling.

SUMMARY OF THE INVENTION

A first object of the present invention is to solve the above problems of conventional magnetic heads, and provide a thin film magnetic head in which the soft magnetic characteristics of an upper core layer and a lower core layer are improved by appropriately adjusting the composition ratios of a soft magnetic material disclosed in, for example, U.S. Pat. No. 5,573,863 to agree with the properties required for the lower core layer and the upper core layer.

A second object of the present invention is to provide a thin film magnetic head and a manufacturing method thereof comprising a shielding layer formed on a magnetoresistive element layer with an insulation layer therebetween so that at both ends of the shielding layer, the thickness gradually decreases, whereby a coil layer can be stably formed on the shielding layer with an insulation layer therebetween, and insulation characteristics of the shielding layer and the coil layer can be stabilized.

A third object of the present invention is to provide a thin film magnetic-head and a manufacturing method thereof, comprising a shielding layer which can be formed by a vacuum deposition method such as a sputtering method or an evaporation method so as to increase the degree of selectivity of a soft magnetic material used for the shielding layer and cope with high frequency recording and high density recording.

In order to achieve the objects of the present invention, the present invention provides a thin film magnetic head comprising a magnetoresistive element layer, a main lead layer for supplying a sensing current to the magnetoresistive element layer, a lower core layer formed on the main lead layer with an insulation layer therebetween and having both a leading-side core function for an inductive head and an upper shielding function for a reading head, an upper core layer opposed to the lower core layer with a magnetic gap therebetween in the portion opposite to a recording medium, and a coil layer for applying a magnetic field to both core layers; wherein the upper core layer is made of a soft magnetic material having:

a composition expressed by the formula $Fe_aM_bO_c$ wherein M indicates at least one element elected from Al, Si, Hf, Zr, V, Nb, Ta, W, Mg and the rare earth elements; and composition ratios a, b and c (atomic %) are adjusted to obtain a saturation magnetic flux density of 1.3 T (tesla) or more and a coercive force of 1.0 Oc (oersted) or less in the direction of hard axis.

When the upper core layer is made of an $Fe_aM_bO_c$ alloy, in a ternary diagram of the $Fe_aM_bO_c$ alloy in which the composition ratios of element Fe, element M and element O are shown on the respective sides, the composition ratios a, b and c (atomic %) are preferably surrounded by the following ten points.

A (Fe:M:O)=(52.5:12.5:35.0)
B (Fe:M:O)=(53.3:11.1:35.6)
C (Fe:M:O)=(57.5:9.0:33.5)
D (Fe:M:O)=(63.3:4.8:31.9)
E (Fe:M:O)=(75.3:4.0:20.7)
F (Fe:M:O)=(76.3:5.0:18.7)
G (Fe:M:O)=(75.0:6.7:18.3)
H (Fe:M:O)=(70.0:9.0:21.0)
I (Fe:M:O)=(57.4:13.0:29.6)
J (Fe:M:O)=(53.5:13.0:33.5)

For example, when the upper core layer is made of a an $Fe_aHf_bO_c$ alloy as an example of $Fe_aM_bO_c$ alloys, in a ternary diagram of the $Fe_aHf_bO_c$ alloy in which the composition ratios of element Fe, element Hf and element O are shown on the respective sides thereof, the composition ratios a, b and c (atomic %) are preferably surrounded by the following ten points:

A (Fe:Hf:O)=(52.5:12.5:35.0)
B (Fe:Hf:O)=(53.3:11.1:35.6)
C (Fe:Hf:O)=(57.5:9.0:33.5)
D (Fe:Hf:O)=(63.3:4.8:31.9)
E (Fe:Hf:O)=(75.3:4.0:20.7)
F (Fe:Hf:O)=(76.3:5.0:18.7)
G (Fe:Hf:O)=(75.0:6.7:18.3)
H (Fe:Hf:O)=(70.0:9.0:21.0)
I (Fe:Hf:O)=(57.4:13.0:29.6)
J (Fe:Hf:O)=(53.5:13.0:33.5)

The upper core layer may be formed of a soft magnetic material having:

a composition expressed by the formula $Fe_aM_b(T+O)_c$ wherein M indicates at least one element selected from Al, Si, Hf, Zr, V, Nb, Ta, W, Mg and the rare earth elements, and T indicates either of B and C; and composition ratios a, b and c (atomic %) are adjusted to obtain a saturation magnetic flux density of 1.3 T (tesla) or more and a coercive force of 1.0 Oc (oersted) or less in the direction of hard axis.

When the upper core layer is made of an $Fe_aM_b(T+O)_c$ alloy, in a ternary diagram of the $Fe_aM_b(B+O)_c$ alloy in which the composition ratios of element Fe, element M and elements (B+O) are shown on the respective sides, the composition ratios a, b and c (atomic %) are preferably in the range surrounded by the following eight points.

A (Fe:M:B+O)=(60.0:9.5:30.5)
B (Fe:M:B+O)=(62.5:6.0:31.5)
C (Fe:M:B+O)=(66.8:4.0:29.2)
D (Fe:M:B+O)=(74.0:5.0:21.0)
E (Fe:M:B+O)=(75.0:7.5:17.5)
F (Fe:M:B+O)=(72.3:10.5:17.2)
G (Fe:M:B+O)=(62.6:13.7:23.7)
H (Fe:M:B+O)=(60.8:12.3:26.9)

For example, when the upper core layer is made of a an $Fe_aHf_b(B+O)_c$ alloy as an example of $Fe_aM_b(T+O)_c$ alloys, in a ternary diagram of the $Fe_aHf_b(B+O)_c$ alloy in which the composition ratios of element Fe, element Hf and elements (B+O) are shown on the respective sides thereof, the composition ratios a, b and c (atomic %) are preferably in the range surrounded by the following eight points:

A (Fe:Hf:B+O)=(60.0:9.5:30.5)
B (Fe:Hf:B+O)=(62.5:6.0:31.5)
C (Fe:Hf:B+O)=(66.8:4.0:29.2)
D (Fe:Hf:B+O)=(74.0:5.0:21.0)
E (Fe:Hf:B+O)=(75.0:7.5:17.5)
F (Fe:Hf:B+O)=(72.3:10.5:17.2)
G (Fe:Hf:B+O)=(62.6:13.7:23.7)
H (Fe:Hf:B+O)=(60.8:12.3:26.9)

The present invention also provides a thin film magnetic head comprising a magnetoresistive element layer, a main lead layer for supplying a sensing current to the magnetoresistive element layer, a lower core layer formed on the main lead layer with an insulation layer therebetween and having both a leading-side core function for an inductive head and an upper shielding function for a reading head, an upper core layer opposed to the lower core layer with a magnetic gap therebetween in the portion opposite to a recording medium, and a coil layer for applying a magnetic field to both core layers; wherein the lower core layer is made of a soft magnetic material having:

a composition expressed by the formula $Fe_aM_bO_c$ wherein M indicates at least one element selected from Al, Si, Hf, Zr, V, Nb, Ta, W, Mg and the rare earth elements; and composition ratios a, b and c (atomic %) are adjusted to obtain a magnetostriction constant of $1.0\times10^{-6}$ or less and a coercive force of 1.0 Oc (oersted) or less in the direction of hard axis.

When the lower core layer is made of an $Fe_aM_bO_c$ alloy, in a ternary diagram of the $Fe_aM_bO_c$ alloy in which the composition ratios of element Fe, element M and element O are shown on the respective sides, the composition ratios a, b and c (atomic %) are preferably in the range surrounded by the following eight points.

C (Fe:M:O)=(57.5:9.0:33.5)
D (Fe:M:O)=(63.3:4.8:31.9)
E (Fe:M:O)=(75.3:4.0:20.7)

F (Fe:M:O)=(76.3:5.0:18.7)

G (Fe:M:O)=(75.0:6.7:18.3)

H (Fe:M:O)=(70.0:9.0:21.0)

I (Fe:M:O)=(57.4:13.0:29.6)

K (Fe:M:O)=(67.5:6.7:25.8)

For example, when the lower core layer is made of a an $Fe_aHf_bO_c$ alloy as an example of $Fe_aM_bO_c$ alloys, in a ternary diagram of the $Fe_aHf_bO_c$ alloy in which the composition ratios of element Fe, element Hf and element O are shown on the respective sides thereof, the composition ratios a, b and c (atomic %) are preferably in the range surrounded by the following eight points:

C (Fe:Hf:O)=(57.5:9.0:33.5)

D (Fe:Hf:O)=(63.3:4.8:31.9)

E (Fe:Hf:O)=(75.3:4.0:20.7)

F (Fe:Hf:O)=(76.3:5.0:18.7)

G (Fe:Hf:O)=(75.0:6.7:18.3)

H (Fe:Hf:O)=(70.0:9.0:21.0)

I (Fe:Hf:O)=(57.4:13.0:29.6)

K (Fe:Hf:O)=(67.5:6.7:25.8)

The lower core layer may be formed of a soft magnetic material having:

a composition expressed by the formula $Fe_aM_b(T+O)_c$ wherein M indicates at least one element selected from Al, Si, Hf, Zr, V, Nb, Ta, W. Mg and the rare earth elements, and T indicates either of B and C; and composition ratios a, b and c (atomic %) are adjusted to obtain a magnetostriction constant of $1.0\times10^{-6}$ or less and a coercive force of 1.0 Oc (oersted) or less in the direction of hard axis.

When the upper core layer is made of an $Fe_aM_b(T+O)_c$ alloy, in a ternary diagram of the $Fe_aM_b(B+O)_c$ alloy in which the composition ratios of element Fe, element M and elements (B+O) are shown on the respective sides, the composition ratios a, b and c (atomic %) are preferably in the range surrounded by the following eight points.

C (Fe:M:B+O)=(66.8:4.0:29.2)

B (Fe:M:B+O)=(74.0:5.0:21.0)

C (Fe:M:B+O)=(75.0:7.5:17.5)

D (Fe:M:B+O)=(72.3:10.5:17.2)

E (Fe:M:B+O)=(62.6:13.7:23.7)

F (Fe:M:B+O)=(57.5:14.5:28.0)

G (Fe:M:B+O)=(57.8:10.2:32.0)

H (Fe:M:B+O)=(58.7:4.4:36.9)

For example, when the lower core layer is made of a an $Fe_aHf_b(B+O)_c$ alloy as an example of $Fe_aM_b(T+O)_c$ alloys, in a ternary diagram of the $Fe_aHf_b(B+O)_c$ alloy in which the composition ratios of element Fe, element Hf and elements (B+O) are shown on the respective sides thereof, the composition ratios a, b and c (atomic %) are preferably in the range surrounded by the following eight points:

C (Fe:Hf:B+O)=(66.8:4.0:29.2)

B (Fe:Hf:B+O)=(74.0:5.0:21.0)

C (Fe:Hf:B+O)=(75.0:7.5:17.5)

D (Fe:Hf:B+O)=(72.3:10.5:17.2)

E (Fe:Hf:B+O)=(62.6:13.7:23.7)

F (Fe:Hf:B+O)=(57.5:14.5:28.0)

G (Fe:Hf:B+O)=(57.8:10.2:32.0)

H (Fe:Hf:B+O)=(58.7:4.4:36.9)

Both the upper core layer and the lower core layer may be formed of a soft magnetic material having a composition expressed by the formula $Ni_aFe_bX_c$ wherein X indicates either of Mo and S, and the composition ratios a, b and c by atomic % satisfy the following relations:

$$44 \leq a \leq 54,\ 42.5 \leq b \leq 54.0,\ 0 \leq c \leq 4,\ a+b+c=100.$$

The Fe—M—O alloy and Fe—M-(T+O) alloy are soft magnetic materials comprising a mixture of an Fe fine crystalline phase and an amorphous phase containing M and O at higher concentrations than the Fe crystalline phase; and films thereof are deposited by a vacuum deposition method such as the sputtering method or the evaporation method. Films of Ni—Fe—X alloys are formed by plating.

In the present invention, the Fe—M—O alloy or Fe—M-(T+O)alloy in which the composition ratios are appropriately adjusted to obtain a saturation magnetic flux density of 1.3 T (tesla) or more and a coercive force of 1.0 Oe (oersted) or less in the direction of hard axis is used for the upper core layer. The Fe—M—O alloy and Fe—M-(T+O) alloy having a saturation magnetic flux density of 1.3 T (tesla) or more and a coercive force of 1.0 Oe (oersted) or less in the direction of hard axis have a resistivity of 100 $\mu\Omega\cdot$cm or more.

The upper core layer may be formed of an Ni—Fe—X alloy in which a saturation magnetic flux density of 1.3 T (tesla) or more and a coercive force of 1.0 Oe (oersted) or less in the direction of hard axis can be obtained by appropriately adjusting the composition ratios. However, the resistivity of this alloy is about 45 to 75 $\mu\Omega\cdot$cm which is lower than the Fe—M—O alloy and Fe—M-(T+O) alloy.

In the present invention, the Fe—M—O alloy or Fe—M-(T+O)alloy in which the composition ratios are appropriately adjusted to obtain a magnetostriction constant of $1.0\times10^{-6}$ or less and a coercive force of 1.0 Oe (oersted) or less in the direction of hard axis is used for the lower core layer having both the core function and the shielding function. The Fe—M—O alloy and Fe—M-(T+O) alloy having a magnetostriction constant of $1.0\times10^{-6}$ or less and a coercive force of 1.0 Oe (oersted) or less have a saturation magnetic flux density of 0.7 T or more, and a resistivity of 100 $\mu\Omega\cdot$cm or more.

The lower core layer may be formed of an Ni—Fe—X alloy in which a saturation magnetic flux density of 0.7 T (tesla) or more and a coercive force of 1.0 Oe (oersted) or less in the direction of hard axis can be obtained by appropriately adjusting the composition ratios. However, the resistivity of this alloy is about 45 to 75 $\mu\Omega\cdot$cm which is lower than the Fe—M—O alloy and Fe—M-(T+O) alloy.

As described above, the Fe—M—O-alloy, Fe—M-(T+O) alloy and Ni—Fe—X alloy have a high resistivity value and thus hardly produce an eddy current even when the recording frequency is increased, and exhibit high magnetic permeability at high frequency.

Therefore, the Fe—M—O-alloy, Fe—M-(T+O) alloy and Ni—Fe—X alloy are soft magnetic materials which can satisfy the properties required for the lower core layer and the upper core layer. Thus, when any one of these three types of soft magnetic materials in which the composition ratios are appropriately adjusted is used for the lower core layer and the upper core layer, a thin film magnetic head which can cope with high-density recording and high-frequency recording can be manufactured.

In the thin film magnetic head of the present invention comprising the reading head having the magnetoresistive element layer, and the inductive head laminated on the reading head and comprising the coil layer and the core layer, the shielding layer is formed on the magnetoresistive element layer with an insulation layer therebetween so that the thickness thereof is substantially uniform and gradually decreases toward both side ends thereof.

Also an anti-milling layer made of a non-magnetic material is preferably formed on either side of the shielding layer. The formation of the anti-milling layers prevents breakage of the insulation layer (the upper gap layer) formed below the shielding layer even by ion milling in formation of the shielding layer.

The material for forming the anti-milling layers preferably has a milling rate lower than that of the material for forming the shielding layer.

The present invention also provides a method of manufacturing a thin film magnetic head comprising a reading head having a magnetoresistive element layer and an inductive head laminated on the reading head and comprising a coil layer and a core layer, the method comprising forming a shielding layer on the magnetoresistive element layer with an insulation layer therebetween by a method comprising the steps of:

forming a resist layer for a lift off method on the insulation layer;

forming an anti-milling layer made of a non-magnetic material on the surface of the resist layer for the lift off method and a portion of the insulation layer where the resist layer for the lift off method was not formed;

removing the resist layer for the lift off method;

forming a soft magnetic material layer on the portion of the insulation layer where the resist layer for the lift off method was removed, and on the anti-milling layer by sputtering or evaporation;

a forming a resist layer on the portion of the insulation layer where the resist layer for the lift off method was removed, with the soft magnetic material layer therebetween;

removing the soft magnetic material layer by ion milling, leaving as a lower core layer the portion of the soft magnetic material layer formed below the resist layer; and removing the resist layer formed on the lower core layer.

At the bottom of either side end of the resist layer for the lift off method is preferably formed a slope.

The anti-milling layer is preferably formed to a thickness of about 3000 angstroms.

The ion milling rate of the material which forms the anti-milling layer is preferably lower (smaller) than that of the material which forms the shielding layer. More preferably, the milling rate ratio of the shielding layer to the anti-milling layer is 2 or more.

In the present invention, since the shielding layer is formed so that the thickness at either end thereof gradually decreases, it is possible to eliminate the step portions at both ends of the lower core layer (the shielding layer), which are formed in the conventional example shown in FIG. 15, stabilize the shape of the coil layer, form the gap layer having a uniform thickness on the lower core layer, and stabilize the insulating function of the gap layer.

Also, since the shielding layer can be formed by the vacuum deposition method such as the sputtering method or the evaporation method, the selectivity of the soft magnetic material used for forming the shielding layer can be widened. For example, when the shielding layer has both the core function and the shielding function, a thin film magnetic head which hardly generate an eddy current even if the frequency is increased can be manufactured by using a soft magnetic material having excellent magnetic characteristics such as a high saturation magnetic flux density, low coercive force, high resistivity, etc., as disclosed in U.S. Pat. No. 5,573,863.

In the method of forming the shielding layer, the resist layer for the lift off method is first formed on the upper gap layer, and the anti-milling layers made of aluminum oxide are formed on both sides of the resist layer for the lift off method. The formation of the anti-milling layers enables protection of the insulation layer (the upper gap layer) formed below the anti-milling layers from the ion milling in the subsequent step.

As shown in FIG. 5E, a resist layer 17 is provided in a recess 16a of a soft magnetic material layer 16. In this state, unidirectional ion milling can form the lower core layer in which the thickness gradually decreases toward the side ends, and the surfaces at the side ends become curved surfaces.

In this way, since the thickness of the shielding layer can be decreased toward the both side ends thereof, the shielding layer having a uniform thickness can be formed on the shielding layer. Also the formation of the anti-milling layers on the upper gap layer prevents the upper gap layer from being affected by ion milling and thus prevents breakage of the upper shielding layer.

DESCRIPTION OF THE PREFERRED EMBODIMENT

Figure 1:
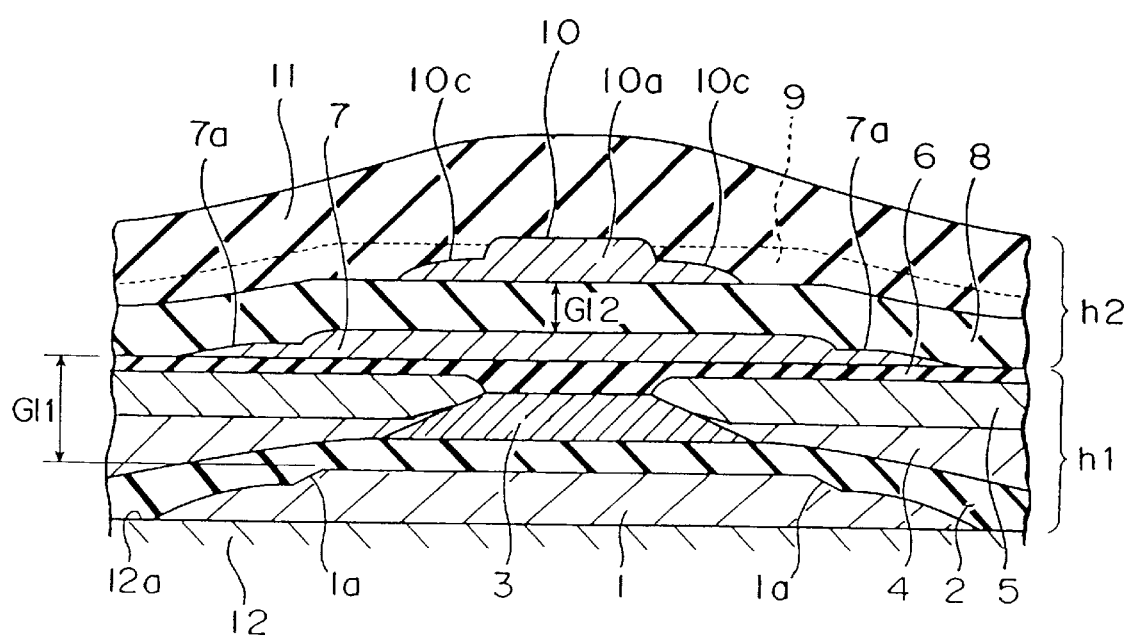
FIG. 1 is an enlarged sectional view showing the structure of a thin film magnetic head in accordance with a first embodiment of the present invention.
Figure 2:
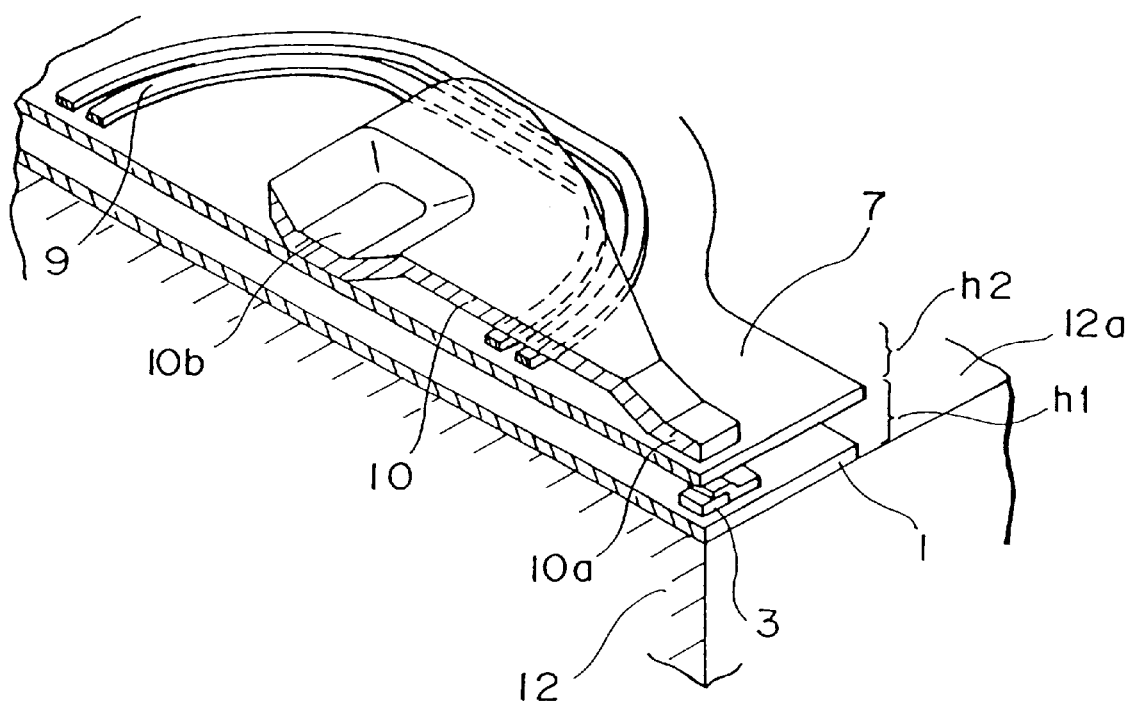
FIG. 2 is a half sectional perspective view showing the shapes of a lower core layer and an upper core layer of a thin film magnetic head.

FIG. 1 is an enlarged sectional view showing a thin film magnetic head in accordance with a first embodiment of the present invention, as viewed from the side opposite to a recording medium. FIG. 2 is a perspective view schematically showing the whole structure of a thin film magnetic head of the present invention which is formed on a slider 12.

The thin film magnetic head shown in FIGS. 1 and 2 is formed on the trailing side end surface of the slider 12 which constitutes a floating head, and comprises a laminate of a reading head h1 and a recording inductive head h2.

The reading head h1 employs the magnetoresistive effect for detecting a leakage magnetic field from the recording medium such as a hard disk or the like to read recording signals. As shown in the drawings, on the trailing side end surface 12a of the slider 12 is formed a lower shielding layer 1 made of a soft magnetic material.

In the present invention, for the lower shielding layer 1, any one of the following three types of soft magnetic materials is preferably used:

(1) Ni—Fe—X (nickel-iron-X) alloy

Soft magnetic materials expressed by the composition formula $Ni_aFe_bX_c$ wherein X indicates at least one element of Nb, Mo and S, and the composition ratios a, b and c by atomic % satisfy the following relations:

$$78.8 \leq a \leq 82.4,\ 11 \leq b \leq 13.8,\ 5.5 \leq c \leq 8.8,\ a+b+c=100$$

(2) Co—Zr—Nb (cobalt-zirconium-niobium) amorphous alloy

Soft magnetic materials expressed by the composition formula $Co_aZr_bNb_c$ wherein the composition ratios a, b and c by atomic % satisfy the following relations:

$$78 \leq a \leq 80,\ 6 \leq b \leq 7,\ 12 \leq c \leq 14,\ 0.4 < (c/c+b) < 0.8,\ a+b+c=100$$

(3) Co—Hf—Ta (cobalt-hafnium-tantalum) amorphous alloy

Soft magnetic materials expressed by the composition formula $Co_aHf_bTa_c$ wherein the composition ratios a, b and c by atomic % satisfy the following relations:

$$79 \leq a \leq 81,\ 7.6 \leq b \leq 17.6,\ 3.8 \leq c \leq 13.2,\ 0.4 < (c/b+c) < 0.6,\ a+b+c=100$$

All films of the Co—Zr—Nb amorphous alloys and Co—Hf—Ta amorphous alloys are deposited by the vacuum deposition method such as the sputtering method of the evaporation method, and films of the Ni—Fe—X alloys are formed by the vacuum deposition method or plating.

Also films of the Co—Zr—Nb amorphous alloys and the Co—Hf—Ta amorphous alloys have no magnetocrystalline anisotropy and high magnetic permeability.

All the above Ni—Fe—X alloys, Co—Zr—Nb amorphous alloys and Co—Hf—Ta amorphous alloys have a saturation magnetic flux density Bs of 0.7 T (tesla) or less, and a magnetostriction constant of as low as $1 \times 10^{-6}$ or less. The coercive force Hc in the direction of hard axis of magnetization (the direction of the external magnetic field of the recording medium) of the NI—Fe—X alloys is 0.50 Oe (oersted) or less; the Co—Zr—Nb alloys, 0.1 Oe or less; and the Co—Hf—Ta alloys, 0.2 Oe or less. These alloys have low coercive force in the direction of hard axis.

When the lower shielding layer 1 is deposited by using a Co—Zr—Nb amorphous alloy or Co—Hf—Ta amorphous alloy, the upper surfaces 1a of the lower shielding layer 1 are curved at both side ends thereof, and the thickness gradually decreases toward the both edges thereof, as shown in FIG. 1. Therefore, a lower gap layer 2 is formed on the lower shielding layer 1 to curve gently while maintaining a substantially uniform thickness.

On the lower shielding layer 1 is provided the lower gap layer 2 made of a non-magnetic material such as $Al_2O_3$ (aluminum oxide). On the lower gap layer 2 is laminated a magnetoresistive element layer 3. The magnetoresistive element layer 3 has a three-layer structure comprising a SAL (soft adjacent layer) made of a soft magnetic material (Co—Zr—Mo alloy or Ni—Fe—Nb alloy), SHUNT made of a non-magnetic material (e.g., Ta (tantalum)), and an MR layer (Fe—Ni alloy) having the magnetoresistive effect, which are formed in turn from below. On either side of the magnetoresistive element layer 3 are formed a hard bias layer 4 for applying a bias magnetic filed to the MR layer and a main lead layer 5 (W (tungsten) or Cu (copper) for supplying a sensing current to the MR layer. On these layers is further formed an upper gap layer 6 made of aluminum oxide or the like. In the reading head h1, since the gap length G11 is determined by the gap between the lower shielding layer 1 and a lower core layer (an upper shielding layer) 7 which will be described below, the lower gap layer 2 and the upper gap layer 6 are preferably formed to be as thin as possible in order to improve the resolution of a leakage magnetic field from the recording medium.

When the lower gap layer 2 is thinned, the gap between the lower shielding layer 1 and the magnetoresistive element layer 3 is decreased, and particularly the magnetic field produced from the SAL serving as the bottom layer of the magnetoresistive element layer 3 easily influences the lower shielding layer 1. Therefore, it is necessary to prevent deterioration in the shielding function of the lower shielding layer 1 even when the lower shielding layer 1 is subjected to the magnetic field generated from the SAL (soft adjacent layer).

In the present invention, since the lower shielding layer is made of any one of the above three types of soft magnetic materials, the lower shielding layer has properties including a low saturation magnetic field density, low coercive force an low magnetostriction. Thus the lower shielding layer 1 is hardly magnetized by the magnetic field from the SAL, and the shielding function of the lower shielding layer 1 less deteriorates.

Also the lower shielding layer 1 hardly captures the magnetic field from the SAL or the hard bias layer, and it is thus possible to stabilize a transverse bias applied to the MR layer from the SAL and a longitudinal bias applied to the MR layer from the hard bias layer. As a result, the linear response of output of the magnetoresistive element can be improved, and the occurrence of Barkhausen noise can be suppressed.

On the upper gap layer 6 is formed the lower core layer 7 made of a soft magnetic material and serving as a core on the leading side of the inductive head h2. The lower core layer 7 also functions as an upper shielding layer of the reading head 1. On the lower core layer 7 is formed a gap layer (a non-magnetic material layer) 8 made of aluminum oxide or the like, and a coil layer 9 patterned to a spiral plane shape is provided on the gap layer 8 without an insulation layer (not shown) made of polyimide or a resist material. The coil layer 9 is made of a non-magnetic conductive material having low electric resistance, such as Cu (copper) or the like.

Further, the coil layer 9 is surrounded by an insulation layer made of polyimide or a resist material, and an upper core layer 10 made of a soft magnetic material and serving as a trailing-side core for the inductive head h2 is formed on the insulation layer. As shown in FIG. 1, the tip 10a of the upper core layer 10 is opposed to the lower core layer 7 with the non-magnetic material layer 8 therebetween to form a magnetic gap having a magnetic gap length G12, for applying a recording magnetic field to the recording medium, the base end of the upper core layer 10 being magnetically connected to the lower core layer 7. On the upper core layer 10 is provided a protective layer 10 made of aluminum oxide or the like.

In the inductive head h2, when a recording current is supplied to the coil layer 9, the recording magnetic field is induced in the lower core layer 7 and the upper core layer 10 from the coil layer 9. In a portion with the magnetic gap length G12, magnetic signals are recorded on the recording medium such as a hard disk due to the leakage magnetic field between the lower core layer and the tip 10a of the upper core layer 10.

In the inductive head h2, in order to enable high-density recording of magnetic signals on the recording medium such as a hard disk or the like, the gap length G12 of the inductive head h2 is as short as possible.

The upper core layer 10 serving as the trailing-side core of the inductive head h2 must be made of a soft magnetic material having a high saturation magnetic flux density, low coercive force and high resistivity. The lower core layer 7 serving as both the leading-end core of the inductive head h2 and the upper shield of the reading head h1 must be made of a soft magnetic material having a lower saturation magnetic flux density than the upper core layer 10, low coercive force, high resistivity and a low magnetostriction constant. Also the direction (the direction perpendicular to the drawing of FIG. 1) of the external magnetic field from the recording medium is preferably the direction of hard axis of magnetization.

In the present invention, examples of materials for the lower core layer 7 and the upper core layer 10 include the following three types of soft magnetic materials:

(1) Soft magnetic materials expressed by the composition formula $Fe_aM_bO_c$ wherein M is at least one element of Al, Si, Hf, Zr, Ti, V, Nb, Ta, W, Mg and the rare earth elements.

Fe is a main component and an element which bears magnetism. An increase in the Fe composition ratio (atomic %) permits achievement of a low magnetostriction constant, but excessive increase in the Fe composition ratio (atomic %) causes a decrease in resistivity. Element M is necessary for forming an amorphous phase and obtaining soft magnetic characteristics. These elements combine with oxygen to form a high-resistivity amorphous phase of an oxide.

More preferably, a bcc-structure Fe fine crystalline phase and an amorphous phase containing elements M and O at higher concentrations than the crystalline phase are mixed, and the ratio of the fine crystalline phase is 70% or less.

When an $Fe_aM_bO_c$ alloy is used for the upper core layer 10, the composition ratios a, b and c must be appropriately adjusted to obtain a saturation magnetic flux density of 1.3 T (tesla) or more, and a coercive force of 1.0 Oe (oersted) or less in the direction of hard axis. An Fe—M—O alloy having a saturation magnetic flux density of 1.3 T (tesla) or more, and a coercive force of 1.0 Oe (oersted) or less in the direction of hard axis has a resistivity of 100 ($\mu\Omega$·cm) or more. In order to further increase the saturation magnetic flux density, an appropriate amount of Co (cobalt) may be added to Fe.

When an $Fe_aM_bO_c$ alloy is used for the lower core layer 7, the composition ratios a, b and c must be appropriately controlled to obtain a coercive force of 1.0 Oe (oersted) or less in the direction of hard axis, and a magnetostriction constant of $1.0 \times 10^{-6}$ or less. An Fe—M—O alloy having a coercive force of 1.0 Oe (oersted) or less and a magnetostriction constant of $1.0 \times 10^{-6}$ or less has a saturation magnetic flux density of 0.7 T or more and a resistivity of 100 ($\mu\Omega$·cm) or more.

In the present invention, the composition ratios of an Fe—Hf—O (iron-hafnium-oxygen) as an example of Fe—M—O alloys were changed, and soft magnetic characteristics were measured at each of the composition ratios to determine a composition range suitable for the properties necessary for the lower core layer 7 and the upper core layer 10 from measurements of the soft magnetic characteristics.

The composition ratios of Fe—M—O alloys were changed to the values at each of the measurement points a to 1 shown in Table 1, and a saturation magnetic flux density, coercive force in the direction of hard axis, resistivity and a magnetostriction constant were measured at each of the measurement points. The heat treatment temperature was 200° C. or less. The results of measurement are shown in Table 1.

TABLE 1

| Type | Symbol | Composition Fe | Hf | O | Bs(T) | Hc(Oe) | $\rho(\mu\Omega$·cm) | $\lambda s(\times 10^{-6})$ |
|---|---|---|---|---|---|---|---|---|
| Measurement point | a | 54.8 | 8.9 | 36.3 | 0.9 | 0.9 | 45 | 2.8 |
| | b | 53.0 | 18.5 | 28.5 | 0.8 | 4.2 | 320 | 3.3 |
| | c | 61.5 | 9.7 | 28.8 | 1.4 | 0.8 | 330 | 0.9 |
| | d | 67.6 | 3.0 | 29.4 | 0.9 | 2.3 | 180 | 0.8 |
| | e | 56.0 | 22.0 | 22.0 | 0.6 | 6.3 | 250 | 1.5 |
| | f | 64.5 | 13.5 | 22.0 | 1.0 | 2.1 | 200 | 0.9 |
| | g | 72.0 | 6.0 | 22.0 | 1.5 | 0.9 | 120 | 0.7 |
| | h | 47.5 | 21.5 | 31.0 | 0.6 | 5.6 | 480 | 3.5 |
| | i | 52.0 | 15.5 | 32.5 | 1.0 | 1.8 | 350 | 2.8 |
| | j | 55.7 | 10.8 | 33.5 | 1.3 | 0.5 | 420 | 1.6 |
| | k | 59.5 | 7.2 | 33.3 | 1.2 | 0.9 | 250 | 0.9 |
| | l | 64.0 | 3.0 | 33.0 | 0.7 | 3.0 | 220 | 0.7 |
| Boundary point | A | 52.5 | 12.5 | 35.0 | | | | |
| | B | 53.3 | 11.1 | 35.6 | | | | |
| | C | 57.5 | 9.0 | 33.5 | | | | |

TABLE 1-continued

| Type | Symbol | Composition Fe | Hf | O | Bs(T) | Hc(Oe) | ρ(μΩ·cm) | λs(× 10⁻⁶) |
|---|---|---|---|---|---|---|---|---|
| | D | 63.3 | 4.8 | 31.9 | | | | |
| | E | 75.3 | 4.0 | 20.7 | | | | |
| | F | 76.3 | 5.0 | 18.7 | | | | |
| | G | 75.0 | 6.7 | 18.3 | | | | |
| | H | 70.0 | 9.0 | 21.0 | | | | |
| | I | 57.4 | 13.0 | 29.6 | | | | |
| | J | 53.5 | 13.0 | 33.5 | | | | |
| | K | 67.5 | 6.7 | 25.8 | | | | |
| | L | 55.0 | 7.5 | 37.5 | | | | |
| | M | 50.8 | 11.1 | 38.1 | | | | |
| | N | 47.5 | 15.5 | 37.0 | | | | |

Figure 7:
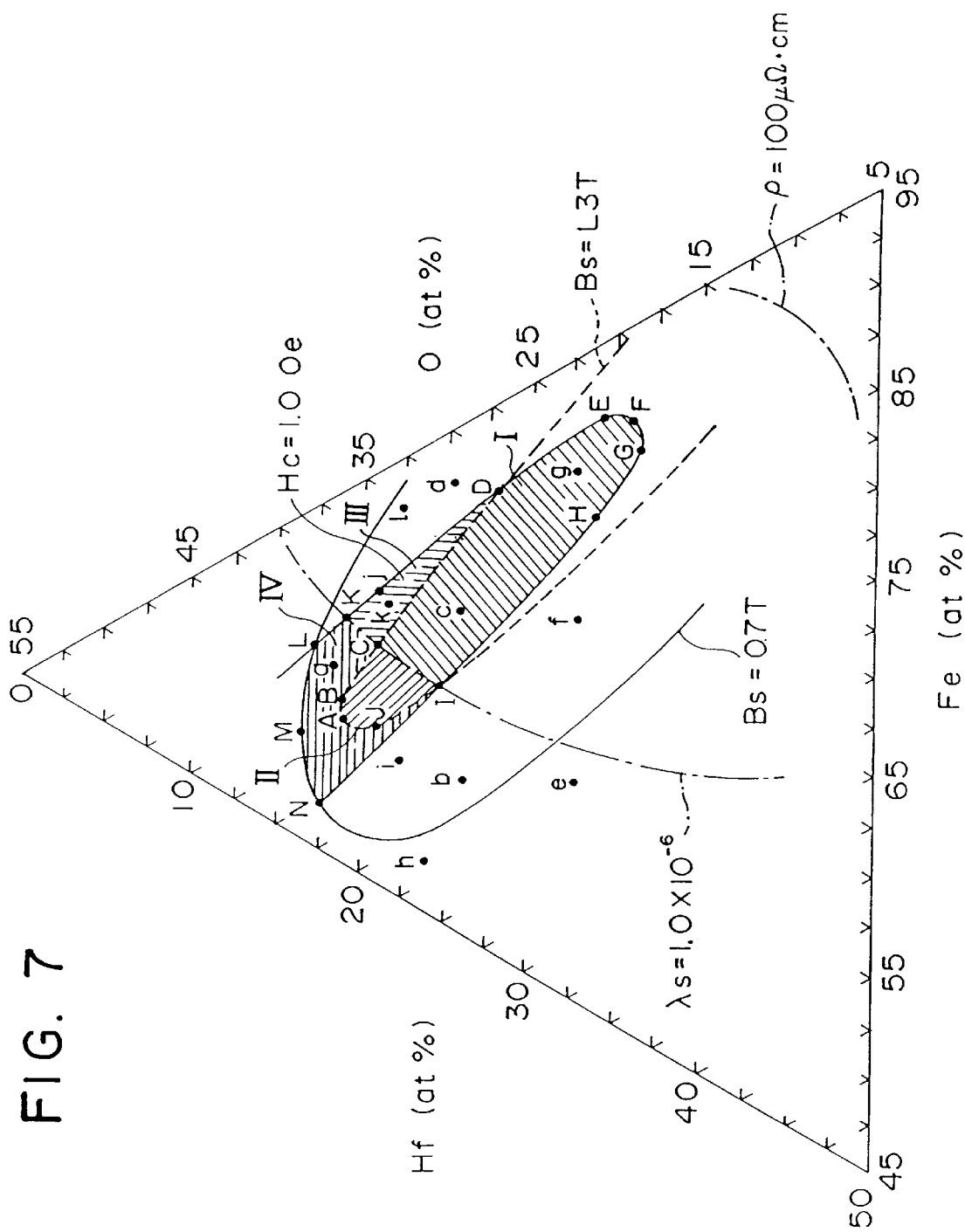
FIG. 7 is a ternary diagram of a soft magnetic material composed of Fe, Hf and O.

The measurement points shown in Table 1 were plotted in a ternary diagram of FIG. 7, and on the basis of the values of the saturation magnetic flux density, coercive force in the direction of hard axis, resistivity and magnetostriction constant at each of the measurement points, boundaries of saturation magnetic flux densities of 0.7 T and 1.3 T. a boundary of a coercive force of 1.0 Oe in the direction of hard axis, a boundary of a resistivity of 100 μΩ·cm, and a boundary of a magnetostriction constant of $1.0 \times 10^{-6}$ were drawn on the ternary diagram of FIG. 7.

The two solid lines shown in FIG. 7 respectively show the boundaries of saturation magnetic flux densities Bs of 0.7 T and 1.3 T, and the saturation magnetic flux density increases toward the bottom right corner of the ternary diagram (in the direction in which the Fe composition ratio increases, and the O composition ratio decreases). A curve shown by a dotted line shows the boundary of a coercive force Hc of 1.0 Oe in the direction of hard axis, and the coercive force Hc decreases toward the upper left side (in the direction in which the Fe composition ratio decreases, and the O composition ratio increases). A curve shown by a one-dot chain line shows the boundary of a magnetostriction constant λs of $1.0 \times 10^{-6}$, and the magnetostriction constant decreases toward the right of the drawing, i.e., in the direction in which the Fe composition ratio increases. A curve shown by a two-dot chain line shows the boundary of a resistivity ρ of 100 μΩ·cm, and the resistivity increases toward the upper right of the diagram (in the direction in which the Fe composition ratio decreases, and the C composition ratio increases).

The results of measurement indicate that when an Fe—Hf—O-alloy is used for the upper core layer, the use of composition ratios in the shadowed regions (I) and (II) shown in FIG. 7 permits achievement of a saturation magnetic flux density of 1.3 T or more, a coercive force of 1.0 Oe or less in the direction of hard axis and a resistivity of 100 μΩ·cm or more.

The shadowed regions (I) and (II) shown in FIG. 7 can also be represented as the range surrounded by the boundary points A, B, C, D, E, F, G, H, I and J shown in Table 1.

When an Fe—Hf—O alloy is used for the lower core layer, the use of composition ratios in the shadowed regions (I) and (III) shown in FIG. 7 permits achievement of a saturation magnetic flux density of 0.7 T or more, a coercive force of 1.0 Oe or less in the direction of hard axis, a resistivity of 100 μΩ·cm or more and a magnetostriction constant of $1.0 \times 10^{-6}$ or less.

The shadowed regions (I) and (III) shown in FIG. 7 can also be represented as the range surrounded by the boundary points C, D, E, F, G, H, I and K shown in Table 1.

(2) Soft magnetic materials expressed by the composition formula $Fe_aM_b(T+O)_c$ wherein M is at least one element selected from Al, Si, Hf, Zr, Ti, V, Nb, Ta, W, Mg and the rare earth elements, and T is either element of B and C.

Fe is a main component and an element which bears magnetism. An increase in the Fe composition ratio (atomic %) permits achievement of a low magnetostriction constant, but excessive increase in the Fe composition ratio (atomic %) causes a decrease in resistivity. Element M is necessary for forming an amorphous phase and obtaining soft magnetic characteristics. These elements combine with oxygen to form a high-resistivity amorphous phase of an oxide.

More preferably, a bcc-structure Fe fine crystalline phase and an amorphous phase containing elements M and O at higher concentrations than the crystalline phase are mixed, and the ratio of the fine crystalline phase is 70% or less.

When an $Fe_aM_b(T+O)_c$ alloy is used for the upper core layer 10, the composition ratios a, b and c must be appropriately adjusted to obtain a saturation magnetic flux density of 1.3 T (tesla) or more, and a coercive force of 1.0 Oe (oersted) or less in the direction of hard axis. An Fe—M—T—O alloy having a saturation magnetic flux density of 1.3 T (tesla) or more, and a coercive force of 1.0 Oe (oersted) or less in the direction of hard axis has a resistivity of 100 (μΩ·cm) or more. In order to further increase the saturation magnetic flux density, an appropriate amount of Co may be added to Fe.

When an $Fe_aM_b(T+O)_c$ alloy is used for the lower core layer 7, the composition ratios a, b and c must be appropriately adjusted to obtain a coercive force of 1.0 Oe (oersted) or less in the direction of hard axis, and a magnetostriction constant of $1.0 \times 10^{-6}$ or less. An Fe—M—O alloy having a coercive force of 1.0 Oe (oersted) or less and a magnetostriction constant of $1.0 \times 10^{-6}$ or less has a saturation magnetic flux density of 0.7 T or more and a resistivity of 100 (μΩ·cm) or more.

In the present invention, the composition ratios of an Fe—Hf—B—O (iron-hafnium-boron-oxygen) alloy as an example of Fe—M—T—O alloys were changed, and soft magnetic characteristics were measured at each of the composition ratios to determine a composition range suitable for the properties necessary for the lower core layer 7 and the upper core layer 10 from measurements of the soft magnetic characteristics.

The composition ratios of Fe—Hf—B—O alloys were changed to the values at each of the measurement points a to m shown in Table 2, and a saturation magnetic flux density, coercive force in the direction of hard axis, resistivity and a magnetostriction constant were measured at each of the measurement points. The heat treatment temperature was 200° C. or less. The results of measurement are shown in Table 2.

TABLE 2

| Type | Symbol | Composition Fe | Hf | O | Bs(T) | Hc(Oe) | ρ(μΩ·cm) | λs(× 10⁻⁶) |
|---|---|---|---|---|---|---|---|---|
| Measurement point | a | 55.5 | 17.5 | 27.0 | 0.7 | 2.3 | 550 | 3.0 |
| | b | 63.0 | 10.0 | 27.0 | 1.4 | 0.7 | 820 | 0.9 |
| | c | 67.6 | 5.4 | 27.0 | 1.3 | 1.0 | 250 | 0.7 |
| | d | 61.5 | 19.0 | 19.5 | 0.7 | 2.5 | 210 | 0.9 |
| | e | 69.5 | 10.7 | 19.8 | 1.4 | 0.9 | 350 | 0.6 |
| | f | 73.7 | 6.5 | 19.8 | 1.4 | 1.0 | 320 | 0.6 |
| | g | 57.0 | 8.3 | 34.7 | 0.8 | 0.8 | 1500 | 1.5 |
| | h | 50.3 | 14.8 | 34.9 | 0.6 | 1.0 | 2300 | 5.6 |
| | i | 55.0 | 10.3 | 34.7 | 0.7 | 0.6 | 1500 | 2.3 |
| | j | 59.8 | 6.3 | 33.9 | 1.0 | 0.8 | 450 | 0.9 |
| | k | 51.5 | 19.0 | 29.5 | 0.6 | 2.0 | 380 | 4.5 |
| | l | 55.0 | 15.7 | 29.3 | 0.8 | 1.2 | 420 | 2.1 |
| | m | 53.8 | 11.9 | 34.3 | 1.2 | 0.8 | 320 | 0.9 |
| Boundary point | A | 60.0 | 9.5 | 30.5 | | | | |
| | B | 62.5 | 6.0 | 31.5 | | | | |
| | C | 66.8 | 4.0 | 29.2 | | | | |
| | D | 74.0 | 5.0 | 21.0 | | | | |
| | E | 75.0 | 7.5 | 17.5 | | | | |
| | F | 72.3 | 10.5 | 17.2 | | | | |
| | G | 62.6 | 13.7 | 23.7 | | | | |
| | H | 60.8 | 12.3 | 26.9 | | | | |
| | I | 57.5 | 14.5 | 28.0 | | | | |
| | J | 57.8 | 10.2 | 32.0 | | | | |
| | K | 58.7 | 4.4 | 36.9 | | | | |
| | L | 58.3 | 4.5 | 37.2 | | | | |
| | M | 55.6 | 7.5 | 36.9 | | | | |
| | N | 53.3 | 11.7 | 35.0 | | | | |
| | O | 52.5 | 14.6 | 32.9 | | | | |

Figure 8:
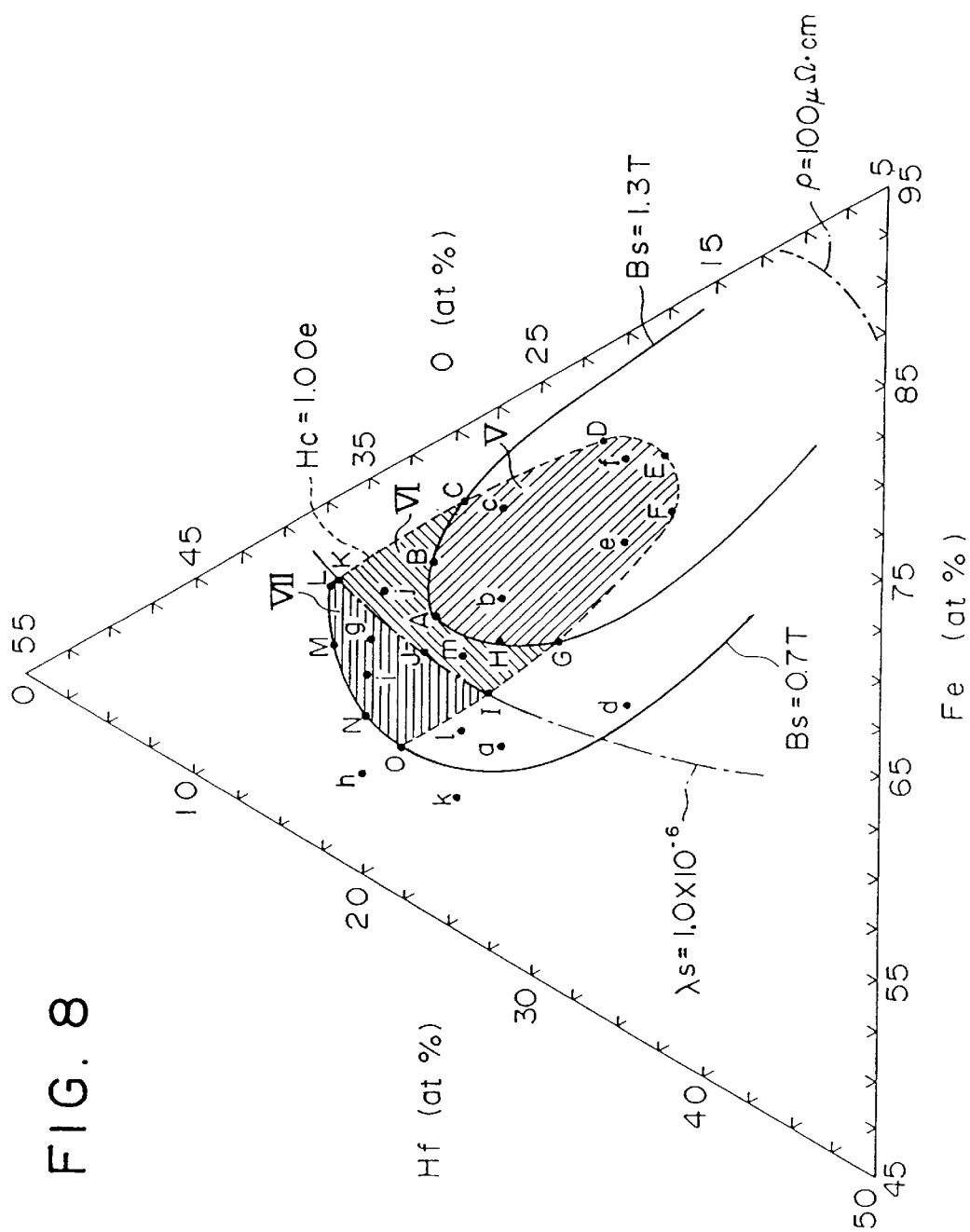
FIG. 8 is a ternary diagram of a soft magnetic material composed of Fe, Hf and (B+O)

The measurement points shown in Table 1 were plotted on a ternary diagram of FIG. 8, and on the basis of the values of the saturation magnetic flux density, coercive force in the direction of hard axis, resistivity and magnetostriction constant at each of the measurement points, boundaries of saturation magnetic flux densities of 0.7 T and 1.3 T, a boundary of a coercive force of 1.0 Oe in the direction of hard axis, a boundary of a resistivity of 100 μΩ·cm, and a boundary of a magnetostriction constant of $1.0 \times 10^{-6}$ were drawn on the ternary diagram of FIG. 8.

The two solid lines shown in FIG. 8 respectively show the boundaries of saturation magnetic flux densities Bs of 0.7 T and 1.3 T, and the saturation magnetic flux density increases toward the bottom right corner of the ternary diagram (in the direction in which the Fe composition ratio increases, and the (B+O) composition ratio decreases). A curve shown by a dotted line shows the boundary of a coercive force Hc of 1.0 Oe in the direction of hard axis, and the coercive force Hc decreases toward the upper left (in the direction in which the Fe composition ratio decreases, and the (B+O) composition ratio increases). A curve shown by a one-dot chain line shows the boundary of a magnetostriction constant λs of $1.0 \times 10^{-6}$, and the magnetostriction constant decreases toward the right of the drawing, i.e., in the direction in which the Fe composition ratio increases. A curve shown by a two-dot chain line shows the boundary of a resistivity ρ of 100 μΩ·cm, and the resistivity increases toward the upper right of the diagram (in the direction in which the Fe composition ratio decreases, and the (B+O) composition ratio increases).

The results of measurement indicate that when an Fe—Hf—B—O alloy is used for the upper core layer, the use of composition ratios in the shadowed region (V) shown in FIG. 8 permits achievement of a saturation magnetic flux density of 1.3 T or more, a coercive force of 1.0 Oe or less in the direction of hard axis and a resistivity of 100 μΩ·cm or more.

The shadowed region (V) shown in FIG. 8 can also be represented as the range surrounded by the boundary points A, B, C, D, E, F, G, and H shown in Table 2.

When an Fe—Hf—B—O alloy is used for the lower core layer, the use of composition ratios in the shadowed regions (V) and (VI) shown in FIG. 8 permits achievement of a saturation magnetic flux density of 0.7 T or more, a coercive force of 1.0 Oe or less in the direction of hard axis, a resistivity of 100 μΩ·cm or more and a magnetostriction constant of $1.0 \times 10^{-6}$ or less.

The shadowed regions (V) and (VI) shown in FIG. 8 can also be represented as the range surrounded by the boundary points C, D, E, F, G, I, J and K shown in Table 2.

All films of the Fe—M—O alloy and the Fe—M—T—O alloy are deposited by the vacuum deposition method such as the sputtering method or the evaporation method, and the lower core layer and the upper core layer can be formed to a thickness smaller than the layers formed by plating permalloy. As shown in FIG. 1, the upper surfaces 7a of the lower core layer 7 at both side ends thereof and the upper surfaces 10a of the upper core layer 10 are formed to be curved so that the thickness gradually decreases toward the both edges thereof. Therefore, the gap layer is formed on the upper core layer 7 while maintaining a substantially uniform thickness.

(3) Soft magnetic materials expressed by the composition formula $Ni_aFe_bX_c$ wherein X indicates either of the elements Mo and S, and the composition ratios a, b and c by atomic % satisfy the following relations:

$44 \leq a \leq 54$, $42.5 \leq b \leq 54$, $0 \leq c \leq 4$, and $a+b+c=100$

When X is Mo, the composition ratios a, b and c preferably satisfy the following relations:

$44.2 \leq a \leq 48.3$, $50.6 \leq b \leq 53.6$, $0 \leq c \leq 1.5$, and $a+b+c=100$ When X is S, the composition ratios a, b and c preferably satisfy the following relations:

$48 \leq a \leq 453.8$, $42.5 \leq b \leq 49.4$, $4.0 \leq c \leq 4$, and $a+b+c=100$ The formation of an Ni—Fe—X alloy having the above composition ratios permits achievement of a saturation magnetic flux density of 1.3 T or more, a coercive force of 0.20 Oe or less in the direction of hard axis, a magnetostriction constant of $1.0 \times 10^{-6}$ or less and a resistive of about 45 to 75 $\mu\Omega\cdot$cm.

Figure 9:
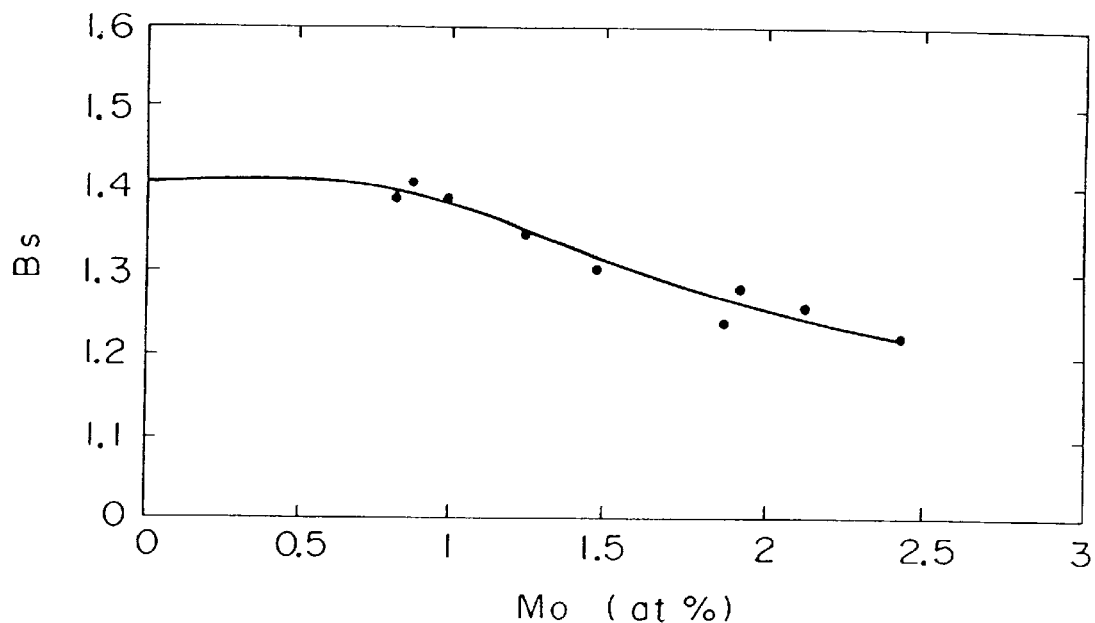
FIG. 9 is a graph showing the relation between the composition ratio (atomic %) of Mo which constitutes a Ni—Fe—Mo alloy and saturation magnetic flux density Bs.
Figure 10:
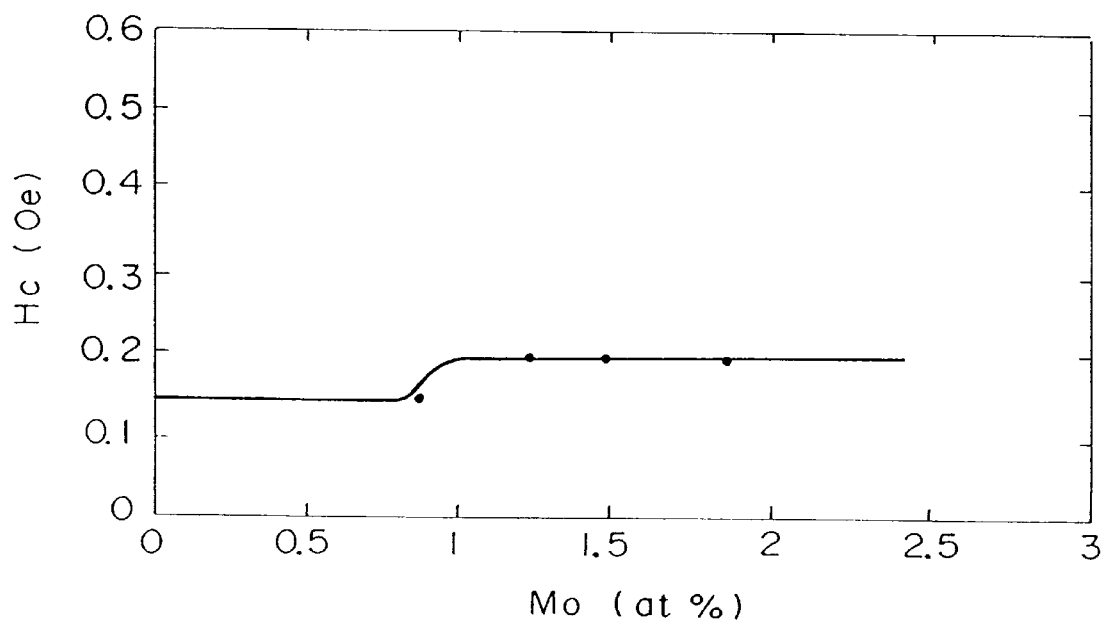
FIG. 10 is a graph showing the relation between the composition ratio (atomic %) of Mo which constitutes an Ni—Fe—Mo alloy and coercive force Hc.
Figure 11:
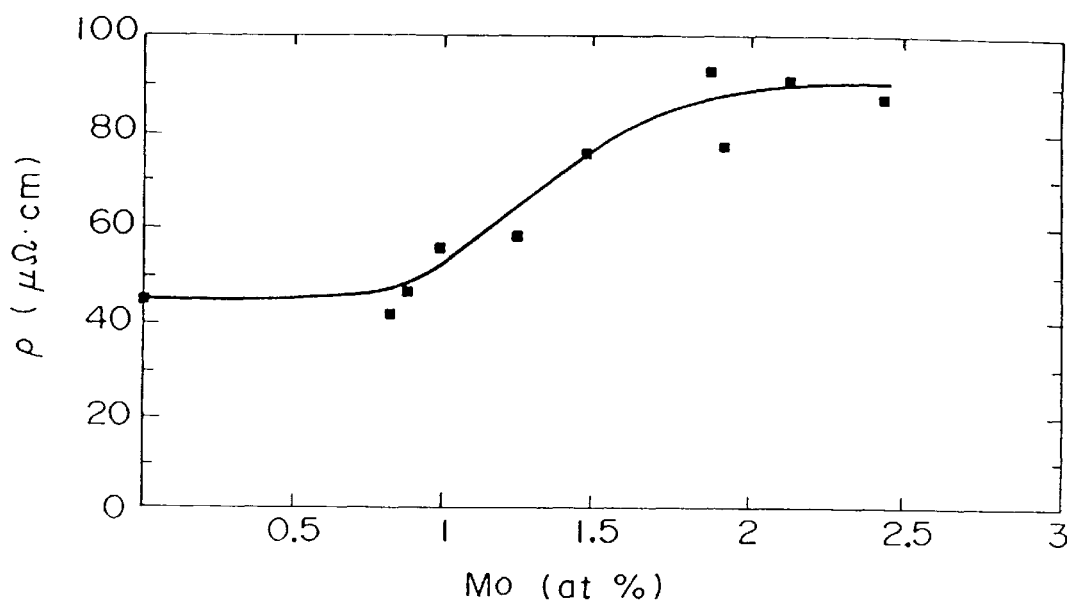
FIG. 11 is a graph showing the relation between the composition ratio (atomic %) of Mo which constitutes an Ni—Fe—Mo alloy and resistivity $\rho$.

FIGS. 9 to 11 are graphs respectively showing the relations between the composition ratio of Mo which constitutes an Ni—Fe—Mo (nickel-iron-molybdenum) alloy and measurements of the soft magnetic characteristics.

In experiment, the relations of the Mo composition ratio and saturation magnetic flux density Bs, coercive force Hc in the direction of hard axis, and resistivity ρ were measured by changing the Mo composition ratio of the Ni—Fe—Mo alloy from 0 to 2.5 (atomic %), while fixing the Ni composition ratio at 44.2 to 48.3 (atomic %) and the Fe composition ratio at 50.6 to 53.63 (atomic %).

FIG. 9 is a graph showing the relation between the Mo composition ratio and saturation magnetic flux density Bs.

The graph indicates that as the Mo composition increases, the saturation magnetic flux density decreases. Particularly, when the Mo composition ratio is about 0 to 1.5 (atomic %), a saturation magnetic flux density Bs of 1.3 T or more can be obtained.

FIG. 10 is a graph showing the relation between the composition ratio of Mo and coercive force Hc in the direction of hard axis.

As shown in FIG. 10, even if the composition ratio of Mo is changed from 0 to 2.5 (atomic %), the coercive force Hc in the direction of the hard axis can be kept at 0.2 Oe or less.

FIG. 11 is a graph showing the relation between the composition ratio of Mo and resistivity ρ.

As shown in FIG. 11, a resistivity ρ of 45 $\mu\Omega\cdot$cm or more can be obtained by changing the composition ratio Mo from 0 to 2.5 (atomic %).

These measurement results reveal that at a Mo composition ratio of 0 to 1.5 (atomic %), a saturation magnetic flux density of 1.3 T or more, a coercive force of 0.20 Oe or less in the direction of the hard axis and a resistivity of 45 to 75 $\mu\Omega\cdot$cm can be obtained.

Figure 12:
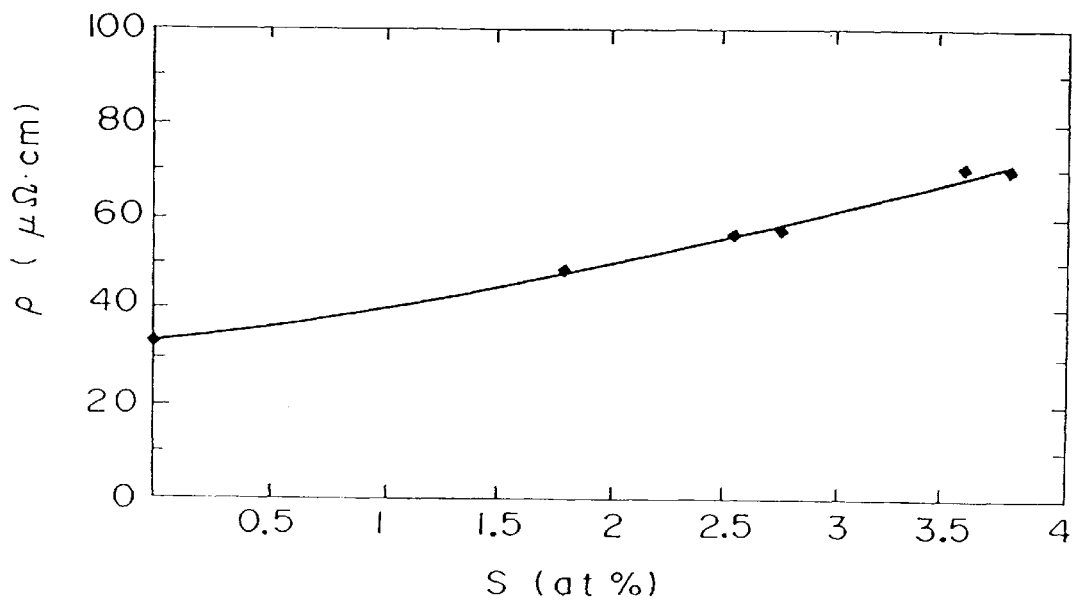
FIG. 12 is a graph showing the relation between the composition ratio (atomic %) of S which constitutes an Ni—Fe—S alloy and resistivity $\rho$.

FIG. 12 is a graph showing the relation between the composition ratio of S which constitutes an Ni—Fe—S (nickel-iron-sulfur) alloy and resistivity.

In experiment, the relation between the composition ratio of S and resistivity p was measured while changing the composition of S from 0 to 4 (atomic %) at a composition ratio Ni fixed to 48 to 53.8 (atomic %) and a composition ratio Fe fixed to 42.5 to 49.4 (atomic %).

As shown in FIG. 12, a resistivity ρ of 33 $\mu\Omega\cdot$cm or more can be obtained by changing the composition ratio of S to 0 to 4 (atomic %).

The measurement results reveal that at a composition ratio of S of 0 to 4 (atomic %) or 0 to 3.3 (atomic %), a resistivity ρ of 33 to 70 $\mu\Omega\cdot$cm or more can be obtained.

A film of an Ni—Fe—X alloy is formed by plating.

By using any one of the above three types of soft magnetic materials in which the composition ratios are appropriately adjusted for the lower core layer 7 and the upper core layer 10, it is possible to increase the saturation magnetic flux density of the lower core layer 7 and the upper core layer 10, decrease the coercive force in the direction of the hard axis and increase the resistivity. Therefore, even if the recording frequency is increased, an eddy current less occurs, and deterioration in high frequency permeability is suppressed.

When the saturation magnetic flux density of the upper core layer 10 is higher than that of the lower core layer 7, magnetization reversal of the leakage magnetic field between the upper core layer 10 and the lower core layer 7 easily takes place.

Further, the coercive force in the direction of the hard axis and the magnetostriction constant of the lower core layer 7 having both the core function and the shielding function are decreased, and the initial magnetic permeability not much deteriorates even if the recording frequency is increased, as described above. Therefore, even if the magnetic gap length G11 between the lower shielding layer 1 and the lower core layer 7 is decreased, the shielding function of the lower core layer to shield the MR film of the magnetoresistive element layer 3 from recording noise does not deteriorate, and thus occurrence of Barkhausen noise due to the recording noise can be prevented.

Figure 3:
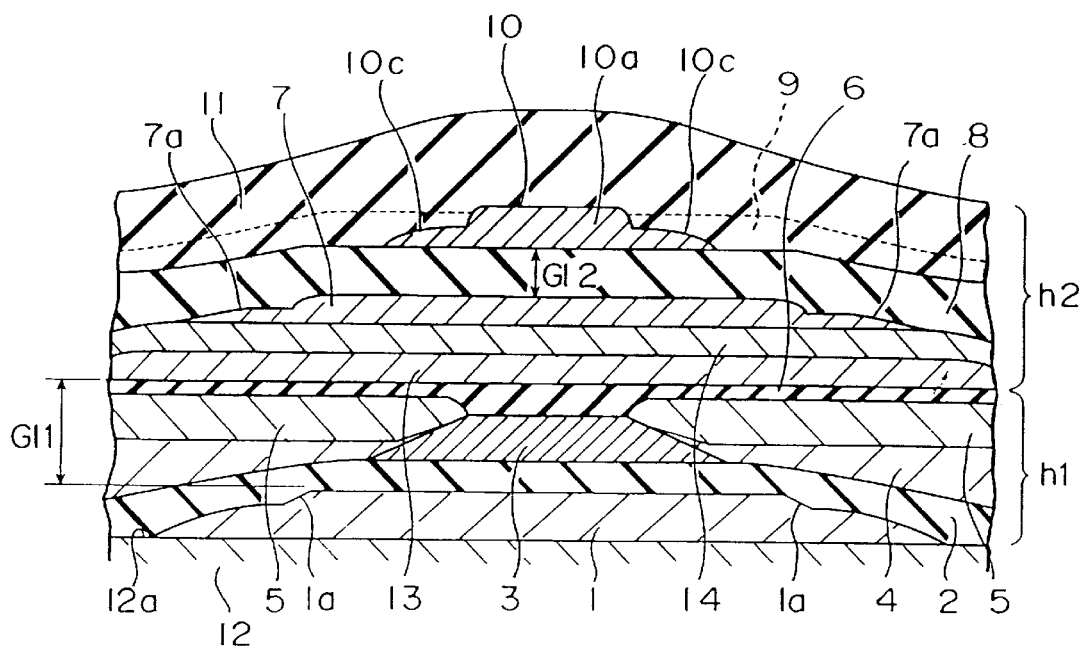
FIG. 3 is an enlarged sectional view showing the structure of a thin film magnetic head in accordance with a second embodiment of the present invention.

FIG. 3 is an enlarged sectional view showing a thin film magnetic head in accordance with a second embodiment of the present invention as viewed from the side opposite to the recording medium.

The thin film magnetic head shown in FIG. 3 is formed on the slider shown in, for example, FIG. 2, and comprises a laminate of a reading head h1 and an inductive head h2.

A lower shielding layer 1 is made of any one of the soft magnetic materials having a low saturation magnetic flux density, a low magnetostriction constant and low coercive force, such as Ni—Fe—X alloys (X=Nb, Mo or S), Co—Zr—Nb amorphous alloys and Co—Hf—Ta amorphous alloys, which are described above with reference to FIG. 1.

On the lower shielding layer 1 are laminated a lower gap layer 2 made of a non-magnetic material and a magnetoresistive element layer 3 having a three-layer structure comprising, SAL, a SHUNT layer and an MR layer. On either side of the magnetoresistive element layer 3 are formed a hard bias layer 4 and a main lead layer 5 made of Cu (copper) or W (tungsten). On these layers is formed an upper gap layer 6 made of a non-magnetic material.

On the upper gap layer 6 is formed an upper shielding layer 13. Like the lower shielding layer 1, the upper shielding layer 13 is made of any one of the soft magnetic materials having a low saturation magnetic flux density, low coercive force and a low magnetostriction constant, such as Ni—Fe—X alloys, Co—Zr—Nb amorphous alloys and Co—Hf—Ta amorphous alloys.

On the upper shielding layer 13 is formed a separation layer 14 made of a non-magnetic material having low electric resistance, such as Cu, Au, Ta, Ti, Cr, Nb, Ni, or the like. The separation layer 14 is provided for completely separating the reading head h1 and the inductive head h2 so that the multilayered film laminated below the separation layer 14 constitutes the reading head h1, and the multilayered film laminated on the separation layer 14 constitutes the inductive head h2.

On the separation layer 14 is formed a lower core layer 7 serving as the leading-side core of the inductive head h2. On the lower core layer 7 are laminated a non-magnetic material layer 8 and an insulation layer (not shown) made of a resist material, and a coil layer 9 patterned to a spiral shape is provided on the insulation layer. The coil layer 9 is made of a non-magnetic conductive material having low electric resistance, such as Cu (copper) or the like. The coil layer 9 is surrounded by an insulation layer (not shown) made of a resist material, and an upper core layer 10 serving as the trailing-side core of the inductive head h2 is formed on the insulation layer. The tip 10a of the upper core layer 10 is opposed to the lower core layer 7 with the non-magnetic materia layer 8 therebetween to form a magnetic gap having a magnetic gap length G12 for applying a recording magnetic field to the recording medium, the base end 10b being magnetically connected to the lower core layer 7. On the upper core layer 10 is provided a protective layer 11 made of a non-magnetic material.

Since the thin film magnetic head shown in FIG. 3 comprises the upper shielding layer 13, the lower core layer 7 need not be provided with the shielding function, unlike the lower core layer 7 shown in FIG. 1.

Therefore, it is necessary to improve the function as the leading-side core of the inductive head h2 by forming the lower core layer 7 using a soft magnetic material having low coercive force, high resistivity and a lower saturation magnetic flux density than the upper core layer 10.

Like the upper core layer 10 shown in FIG. 1, the upper core layer 10 shown in FIG. 3 is preferably made of a soft magnetic material having properties including a high saturation magnetic flux density, low coercive force and high resistivity.

Both the lower core layer 7 and the upper core layer 10 are preferably made of any one of the soft magnetic materials having excellent soft magnetic characteristics, such as Fe—M—O alloys, Fe—M—T—O alloys and Ni—Fe—X alloys, which are described above with reference to FIG. 1.

When the lower core layer 7 is made of an $Fe_aM_bO_c$ alloy or $Fe_aM_b(T+O)_c$ alloy, the composition ratios a, b and c must be adjusted to obtain a saturation magnetic flux density of 0.7 T or more and a coercive force of 1.0 Oe or less in the direction of the hard axis. An Fe—M—O alloy and Fe—M—T—O alloy having a saturation magnetic flux density of 0.7 T or more and a coercive force of 1.0 Oe or less in the direction of the hard axis have a resistivity of 100 $\mu\Omega\cdot cm$ or more.

When the lower core layer 7 is made of an Fe—Hf—O alloy at composition ratios in the shadowed regions (I), (II), (III) and (IV) (the range surrounded by the boundary points D, E, F, G, H, I, N, M, L and K shown in Table 1) shown in FIG. 7, and when the lower core layer 7 is made of an Fe—Hf—B—O alloy at composition ratios in the shadowed regions (V), (VI) and (VII) (the range surrounded by the boundary points C, D, E, F, G, I, O, N, M and L shown in Table 2) shown in FIG. 8, a saturation magnetic flux density of 0.7 T or more, a coercive force of 1.0 Oe or less in the direction of the hard axis and a resistivity of 100 100 $\mu\Omega\cdot cm$ or more can be obtained.

When the lower core layer 7 is made of an Ni—Fe—X alloy at the same composition ratios as described above with reference to FIG. 1, a saturation magnetic flux density of 1.3 T or more, a coercive force of 1.0 Oe or less in the direction of the hard axis and a resistivity of 45 to 75 $\mu\Omega\cdot cm$ or more can be obtained.

For the upper core layer 10, when an Fe—M—O-alloy, Fe—M—T—O alloy or Ni—Fe—X alloy having the same composition ratios as the upper core layer described above with reference to FIG. 1 is used, a saturation magnetic flux density of 1.3 T or more, a coercive force of 1.0 Oe or less in the direction of the hard axis can be obtained. The use of an Fe—M—O alloy shows a resistivity of 100 $\mu\Omega\cdot cm$ or more, and the use of an Ni—Fe—X alloy shows a resistivity of about 45 to 75 $\mu\Omega\cdot cm$.

Figure 4:
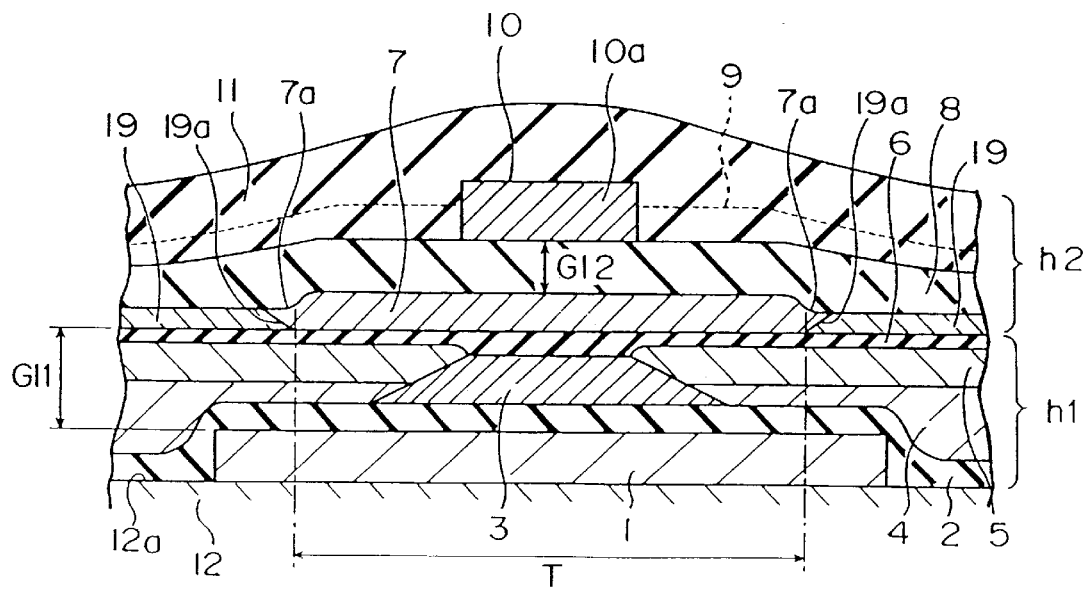
FIG. 4 is an enlarged front view showing the structure of a thin film magnetic head in accordance with a third embodiment of the present invention.

FIG. 4 is an enlarged front view showing a thin film magnetic head in accordance with a third embodiment of the present invention, as viewed from the side opposite to the recording medium. FIG. 2 schematically shows the whole structure of a thin film magnetic head of the present invention which is formed on the slider 12.

The thin film magnetic head shown in FIGS. 4 and 2 is formed at the trailing side end 12a of the slider 12 which constitutes a floating head, and comprises a laminate of a reading head h1 and a recording inductive head h2.

The reading head h1 employs the magnetoresistive effect for detecting a leakage magnetic field from the recording medium such as a hard disk or the like to read recording signals. As shown in the drawings, at the trailing side end 12a of the slider 12 is formed a lower shielding layer 1 made of permalloy (Ni—Fe alloy) or the like.

On the lower shielding layer 1 is provided a lower gap layer 2 made of a non-magnetic material such as aluminum oxide ($Al_2O_3$). On the lower gap layer 2 is laminated a magnetoresistive element layer 3. The magnetoresistive element layer 3 has a three-layer structure comprising a SAL (soft adjacent layer) made of a soft magnetic material (a Co—Zr—Mo alloy or Ni—Fe—Nb alloy), a SHUNT layer made of a non-magnetic material (e.g., Ta (tantalum)), and an MR layer (an Fe—Ni alloy) having the magnetoresistive effect, which are formed in turn from below. On either side of the magnetoresistive element layer 3 are formed a hard bias layer 4 for applying a bias magnetic filed to the MR layer and a main lead layer 5 (W (tungsten) or Cu (copper) for supplying a sensing current to the MR layer. On these layers is further formed an upper gap layer 6 made of aluminum oxide or the like. In the reading head h1, since the gap length Gl1 is determined by the gap between the lower shielding layer 1 and a lower core layer (an upper shielding layer) 8 which will be described below, the lower gap layer 2 and the upper gap layer 6 are preferably formed to be as thin as possible in order to improve the resolution of a leakage magnetic field from the recording medium.

On portions of the upper gap layer 6 except the portion having a width dimension T are respectively formed anti-milling layers 19 made of a non-magnetic material such as aluminum oxide. At the end of each of the anti-milling layers 19 is formed a slope 19a. On the slopes 19a and the portion of the upper gap layer 6 with the width dimension T is formed a lower core layer 7 made of a soft magnetic material by the vacuum deposition method such as the sputtering method or evaporation method. The lower core layer 7 is formed to a constant thickness which gradually decreases toward the both side ends thereof. Also the upper surfaces 7a of the lower core layer at the both side ends thereof are formed in curved surfaces so that the thickness gradually deceases toward the both ends thereof. The lower core layer 7 functions as the leading-side core in the inductive head h2, and as the upper shielding layer in the reading head h1.

On the lower core layer 7 is formed a gap layer (non-magnetic material layer) 8, and a coil layer 9 patterned to a spiral plane shape is provided on the gap layer 8 with an insulation layer (not shown) made of polyimide or a resist material therebetween. The coil layer 9 is made of a non-magnetic conductive material having low electric resistance, such as Cu (copper) or the like.

Figure 15:
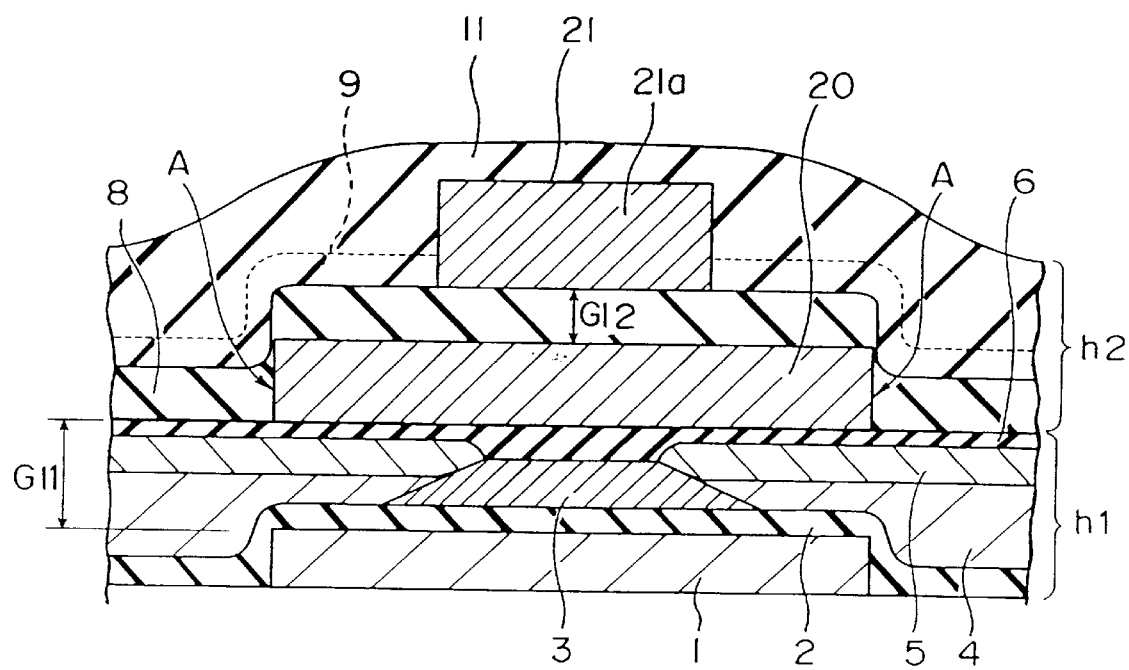
FIG. 15 is an enlarged sectional view showing the structure of a conventional thin film magnetic head.
Figure 16A:
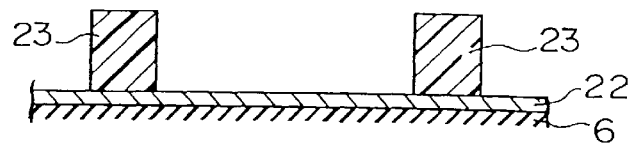
FIGS. 16A to 16F are enlarged sectional views respectively showing the steps of a method of producing a conventional lower core layer.
Figure 16B:
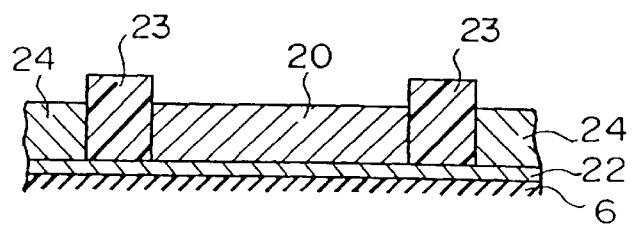
Figure 16C:
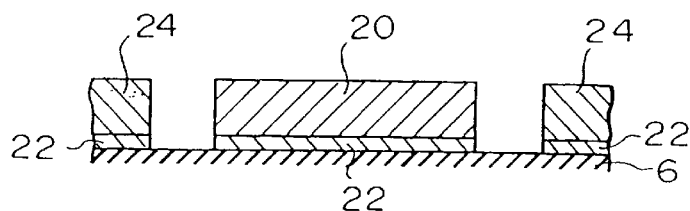
Figure 16D:
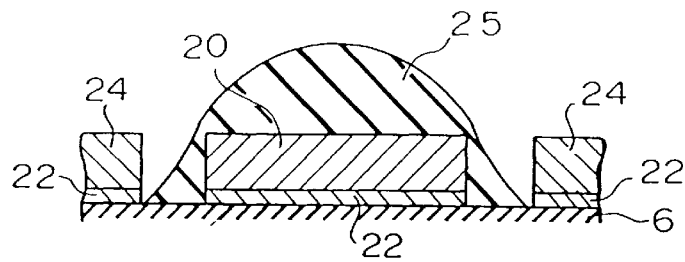
Figure 16E:
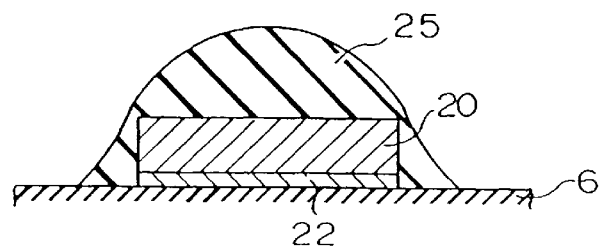
Figure 16F:
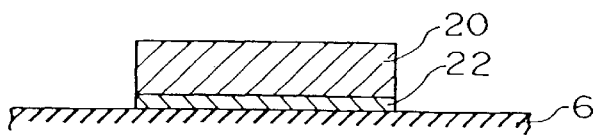

As described above, the lower core layer 7 is formed to a constant thickness which gradually decreases toward the both side ends thereof. Thus, the gap layer 8 is formed on the lower core layer 7 to be gently curved while maintaining a uniform thickness. Therefore, unlike the conventional magnetic head shown in FIG. 15, no step portion is formed in the gap layer 8, thereby hardly causing a defect in the coil layer 9 formed on the gap layer 8 with the insulation layer therebetween.

The coil layer 9 is surrounded by an insulation layer (not shown) made of polyimide or a resist material, and an upper core layer 10 made of a soft magnetic material and functioning as the trailing-side core of the inductive head h2 is formed on the insulation layer. As shown in FIG. 4, the tip 10a of the upper core layer 10 is opposed to the lower core layer 7 with the gap layer 8 therebetween to form a magnetic gap having a magnetic gap length G12 for applying a recording magnetic field to the recording medium, the base end 10b of the upper core layer 10 being magnetically connected to the lower core layer 7. On the upper core layer 10 is provided a protective layer 11 made of aluminum oxide or the like.

In the inductive head h2, when a recording current is supplied to the coil layer 9, a recording magnetic field is induced in the lower core layer 7 and the upper core layer 10 from the coil layer 9. In the portion having the magnetic gap length G12, magnetic signals are recorded on the recording medium such as a hard disk or the like due to the leakage magnetic field between the lower core layer 7 and the tip 10a of the upper core layer 10.

In the present invention, since the lower core layer 7 can be formed by the vacuum deposition method such as the sputtering method or evaporation method, as described above, the selectivity of the soft magnetic material used for forming the lower core layer 7 can be widened. In the present invention, both the core function and the shielding function of the lower core layer 7 are improved by using a soft magnetic material having a lower saturation magnetic flux density than the upper core layer 10, low coercive force, high resistivity and a low magnetostriction constant.

In the present invention, examples of materials for the lower core layer 7 include the following soft magnetic materials:

(1) Soft magnetic materials expressed by the composition formula $Fe_aM_bO_c$ wherein M is at least one element of Al, Si, Hf, Zr, Ti, V, Nb, Ta, W, Mg and the rare earth elements.

(2) Soft magnetic material expressed by the composition formula $Fe_aM_b(T+O)_c$ wherein M is at least one element selected from Al, Si, Hf, Zr, Ti, V, Nb, Ta, W, Mg and the rare earth elements, and T is either element of B and C.

Fe is a main component, and an element which bears magnetism. An increase in the Fe composition ratio (atomic %) permits achievement of a low magnetostriction constant, but excessive increase in the Fe composition ratio (atomic %) causes a decrease in resistivity. Element M is necessary for forming an amorphous phase and obtaining soft magnetic characteristics. These elements combine with oxygen to form a high-resistivity amorphous phase of an oxide.

More preferably, a bcc-structure Fe fine crystalline phase and an amorphous phase containing elements M and O at higher concentrations than the crystalline phase are mixed, and the ratio of the fine crystalline phase is 70% or less.

The composition ratios a, b and c of an $Fe_aM_bO_c$ alloy or $Fe_aM_b(T+O)_c$ alloy are appropriately adjusted to obtain a coercive force of 1.0 Oe (oersted) or less in the direction of the hard axis and a magnetostriction constant of $1.0 \times 10^{-6}$ or less in absolute value. An $Fe_aM_bO_c$ alloy or $Fe_aM_b(T+O)_c$ alloy having a coercive force of 1.0 Oe (oersted) or less in the direction of the hard axis and a magnetostriction constant of $1.0 \times 10^{-6}$ or less in absolute value has a saturation magnetic flux density of 0.7 T (tesla) or more and a resistivity of 100 $\mu\Omega\cdot cm$ or more.

The $Fe_aM_bO_c$ alloy or $Fe_aM_b(T+O)_c$ alloy may also be used for the upper core layer 10. In this case, the composition ratios a, b and c must be appropriately adjusted to obtain a saturation magnetic flux density of 1.3 T or more, and a coercive force of 1.0 Oe or less in the direction of the hard axis. The $Fe_aM_bO_c$ alloy or $Fe_aM_b(T+O)_c$ alloy having a saturation magnetic flux density of 1.3 T or more, and a coercive force of 1.0 Oe or less in the direction of the hard axis has a resistivity of 100 $\mu\Omega\cdot cm$ or more.

By using the above soft magnetic material wherein the composition ratios are appropriately adjusted, for the lower core layer 7 and the upper core layer 10, it is possible to increase the saturation magnetic flux density of each of the lower core layer 7 and the upper core layer 10, decrease the coercive force, and increase the resistivity. Therefore, even if the recording frequency is increased, an eddy current hardly occurs, and deterioration in magnetic permeability at a high frequency is suppressed.

When the saturation magnetic flux density of the lower core layer 7 is lower than that of the upper core layer 10, magnetization reversal of the leakage magnetic field between the lower core layer 7 and the upper core layer 10 easily takes place.

Besides the above materials, soft magnetic materials of Ni—Fe—X (X=Mo or S) can also be used in the vacuum deposition method.

Further, the coercive force in the direction of the hard axis and the magnetostriction constant in absolute value of the lower core layer 7 having both the core function and the shielding function are decreases, and the initial magnetic permeability not much deteriorates even if the recording frequency is increased. Therefore, even if the magnetic gap length G11 between the lower shielding layer 1 and the lower core layer 7 is decreased, the shielding function of the lower core layer 7 to shield the MR film of the magnetoresistive element layer 3 from recording noise does not deteriorate, and thus occurrence of Barkhausen noise due to the recording noise can be prevented.

FIG. 5 is an enlarged sectional view showing the method of producing the lower core layer 7.

Figure 5A:
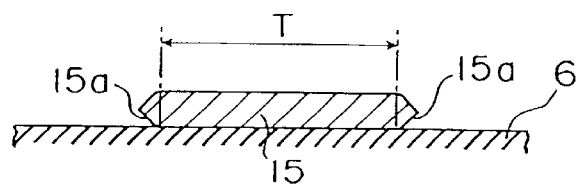
FIGS. 5A to 5G are enlarged sectional views respectively showing the steps of a method of producing a lower core layer of the present invention.

In FIG. 5A, a resist solution for the lift off method is coated on the upper gap layer 6, followed by exposure to form a resist layer 15 for the lift off method on the upper gap layer 6. The resist layer 15 for the lift off method is formed to a constant thickness in the region having the width dimension T, and project at both side ends thereof, a slope 15a being formed at the bottom of either side end of the resist layer 15.

Figure 5B:
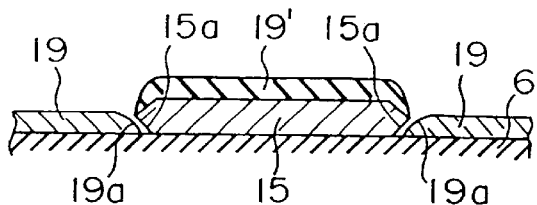

As shown in FIG. 5B, on the resist layer 15 for the lift off method and both sides thereof are deposited by sputtering a non-magnetic material layer 19' made of a non-magnetic material such as aluminum oxide, and anti-milling layers 19, respectively. As shown in FIG. 5B, in the portions below the slopes 15a, the thickness of each of the anti-milling layers 19 gradually decreases to form a slope at either end of the anti-milling layers 19.

The thickness of the anti-milling layers 19 is preferably about 3000 angstroms.

Figure 5C:
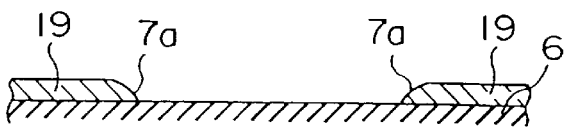
Figure 5D:
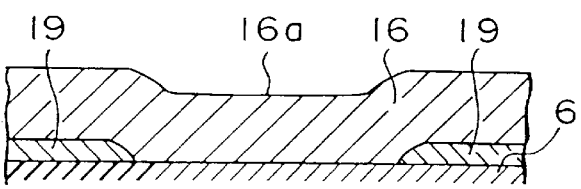

The milling rate of the anti-milling layers 19 is preferably lower (smaller) than that of the soft magnetic material layers 16 shown in FIG. 5D. More preferably, the milling rate ratio of the soft magnetic materia layers 16 to the anti-milling layers 19 is 2 or more.

For example, the milling rate of aluminum oxide ($Al_2O_3$) is about 150 angstrom/min, and the milling rates of permalloy and the above $Fe_aM_bO_c$ and $Fe_aM_b(T+O)_c$ are about 300 angstrom/min. Therefore, when the anti-milling layers 19 are made of aluminum oxide, and the soft magnetic materia layers 16 are made of permalloy, $Fe_aM_bO_c$ or $Fe_aM_b(T+O)_c$, the milling rate ratio of the soft magnetic material layers 16 to the anti-milling layers 19 is about 2.

Besides aluminum oxide, the anti-milling layers may be made of a non-magnetic ceramic material such as $SiO_2$, $Ta_2O_5$, $Si_3N_4$, SiC, AlN, or the like. These materials exhibit a low milling rate and excellent electric insulation properties.

In FIG. 5C, the non-magnetic material layer 19' and the resist layer 15 for the lift off method are removed, leaving the anti-milling layers 19 on the upper gap layer 6.

As shown in FIG. 5D, the soft magnetic material (1) or (2) is deposited on the anti-milling layers 19 and the portion of the upper gap layer 6 with the width dimension T by sputtering to form a soft magnetic material layer 16. As shown in the drawing, a recess 16a is formed in the upper surface of the soft magnetic material layer 16.

Figure 5E:
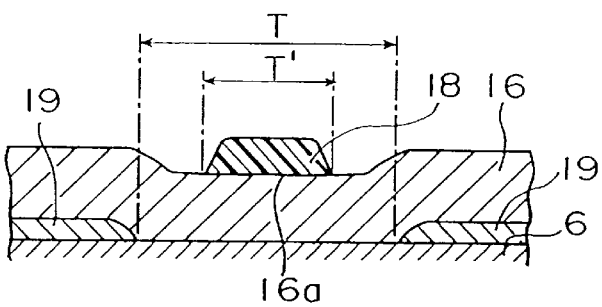

In FIG. 5E, on the upper surface of the soft magnetic material layer 16 is coated a resist solution, followed by exposure to form a resist layer 18 on the recess 16a, as shown in the drawing. The resist layer 18 is preferably formed on the central portion of the soft magnetic material layer 16 having the width dimension T, and the width dimension T' of the resist layer 18 is preferably smaller than the width dimension T.

Figure 5F:
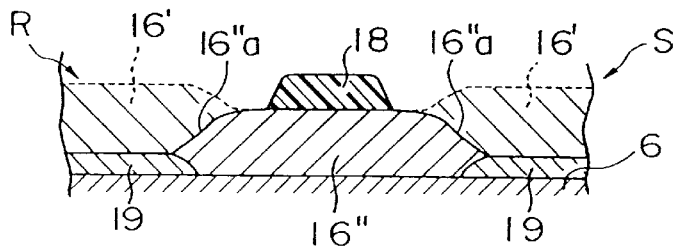

As shown in FIG. 5F, portions 16' of the soft magnetic material layer 16 are removed by ion milling.

In ion milling, Ar (argon) gas containing neutral ions is used, and the ions are applied to the portions 16' of the soft magnetic material layer 16 from the oblique directions shown by arrows R and S to remove the portions 16' of the soft magnetic material layer 16 by a physical function. Since the resist layer 18 is formed on a portion 16" of the soft magnetic material layer 16, the portion 16" is not affected by ion milling and left as a soft magnetic materia layer 16". As shown in FIG. 5F, the upper surfaces 16" a of the soft magnetic materia layer 16" at both side ends thereof are curved so that the thickness gradually decreases toward both edges thereof.

Figure 5G:
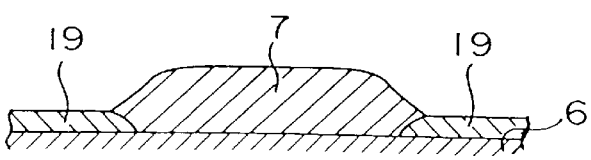

When the portions 16' of the soft magnetic material layer 16 are removed by ion milling, the anti-milling layers 19 formed below the portions 16' are affected directly by ion milling. As described above, the thickness of the anti-milling layers 19 is about 3000 angstroms. However, with such a thickness, the anti-milling layers 19 are not completely removed by ion milling. Therefore, the upper gap layer 6 formed below the anti-milling layers 19 is not at all affected by ion milling. In FIG. 5G, the resist layer 18 formed on the soft magnetic material layer 16" (the lower core layer &) is removed.

As shown in the drawings, the lower core layer 7 is formed on the upper gap layer 6 to have a constant thickness, but the thickness gradually decreases toward the both side ends thereof. Although the anti-milling layers 19 are formed on both sides of the lower core layer 7, the anti-milling layers 19 are made of a non-magnetic material such as aluminum oxide or the like and thus have no influence on the function of the lower core layer 7.

As described above, in the present invention, the lower core layer 7 can be formed by the vacuum deposition method such as the sputtering or evaporation method, and the anti-milling layers 19 made of a non-magnetic material are provided on both sides of the lower core layer 7 (the soft magnetic material layer 16") to prevent the upper gap layer 6 from being affected directly by ion milling, as shown in FIG. 5F.

Figure 6A:
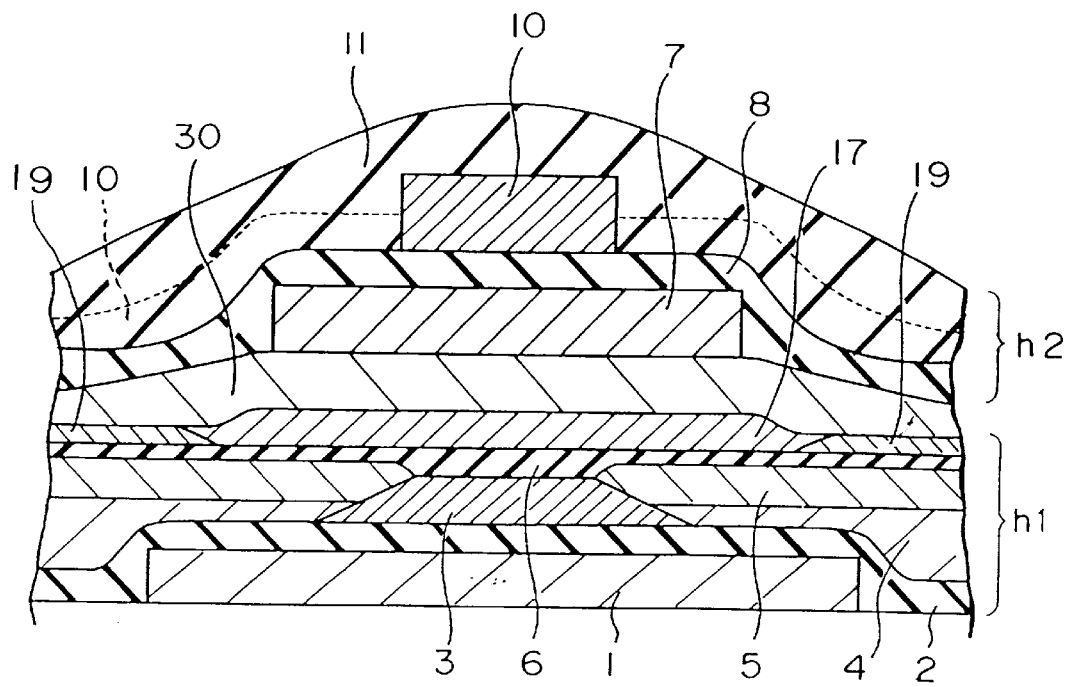
FIGS. 6A and 6B are enlarged front views each showing the structure of a thin film magnetic head in accordance with a fourth embodiment of the present invention.

FIGS. 6A and B are enlarged sectional view each showing a thin film magnetic head in accordance with a fourth embodiment of the present invention as viewed from the side opposite to the recording medium.

The thin film magnetic head shown in FIG. 6A or B comprises an upper shielding layer 17 formed on an upper gap layer 6, and anti-milling layers 19 formed on both sides of the upper shielding layer 17. On the upper shielding layer 17 is formed a separation layer 30 made of a non-magnetic conductive material having low electric resistance, such as Cu or the like. The separation layer 30 is provided for completely separating the reading head h1 and the inductive head h2 so that a multilayered film laminated below the separation layer 30 constitutes the reading head h1, and a multilayered film laminated on the separation layer 30 constitutes the inductive head h2.

As shown in the drawings, the upper shielding layer 17 is formed to a constant thickness, but the thickness gradually decreases toward both side ends thereof. Therefore, the separation layer 30 can be formed on the upper shielding layer 17 to be curved gently, and a lower core layer 7 can easily be formed on the separation layer 30.

The upper shielding layer 17 is formed by completely the same method as that for producing the lower core layer 7 shown in FIG. 3.

Figure 6B:
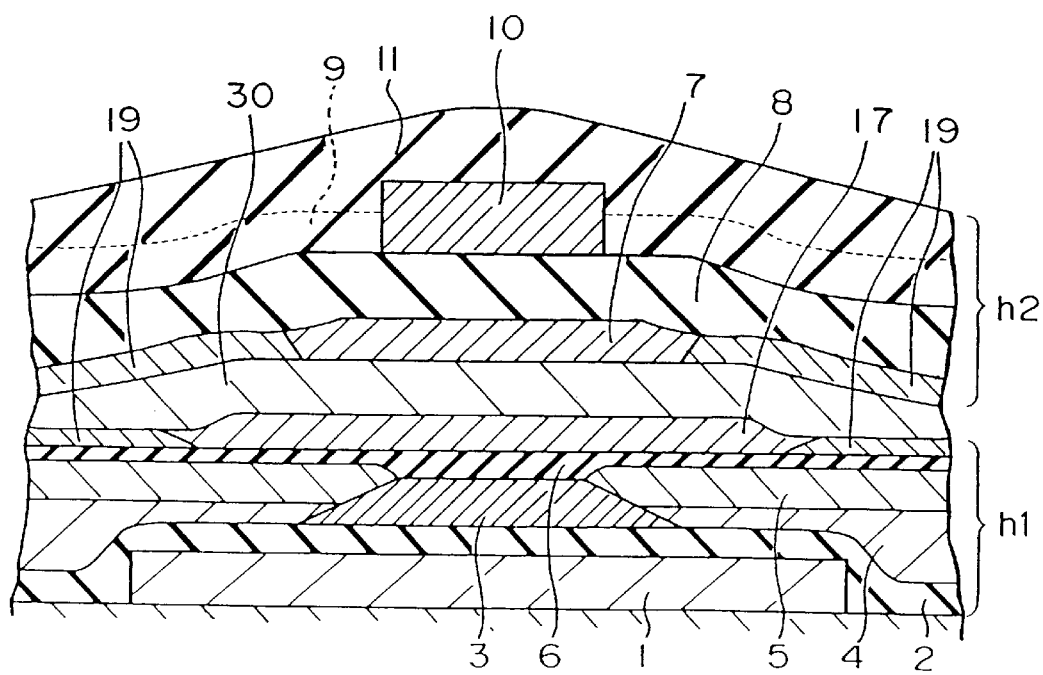

In FIG. 6B, both the upper shielding layer 17 and the lower core layer 7 are formed by the production method shown in FIG. 5. Therefore, the anti-milling layers 19 are formed on both sides of the lower core layer 7, and the lower core layer 7 is formed so that the thickness gradually decreases toward both side ends thereof. In the thin film magnetic head shown in FIG. 6B, the coil layer 9 can be formed more easily than that of the thin film magnetic head shown in FIG. 6A, and thus the structure shown in FIG. 6B can be said to be more preferable.

The upper core layer 10 shown in FIGS. 4, 6A or 6B has a rectangular sectional shape. The upper core layer 10 may be formed by either the sputtering method or the plating method.

EXAMPLE

Six types of soft magnetic materials were prepared which included an Ni—Fe alloy, an Fe—Al—Si alloy, an $Fe_{80.5}Zr_{8.1}N_{11.4}$ alloy, an $Fe_{61}Hf13O_{26}$ alloy, an $Fe_{62}Hf_{11}O_{27}$ alloy, and an $Fe_{68.9}Hf_{10.2}B_{1.0}O_{19.9}$ alloy (all numerical values are by atomic %), and the relation of frequency and initial magnetic permeability of each of the soft magnetic materials was examined. The frequency was changed from 1 to 1000 MHz. The experimental results are shown in FIG. 13.

Figure 13:
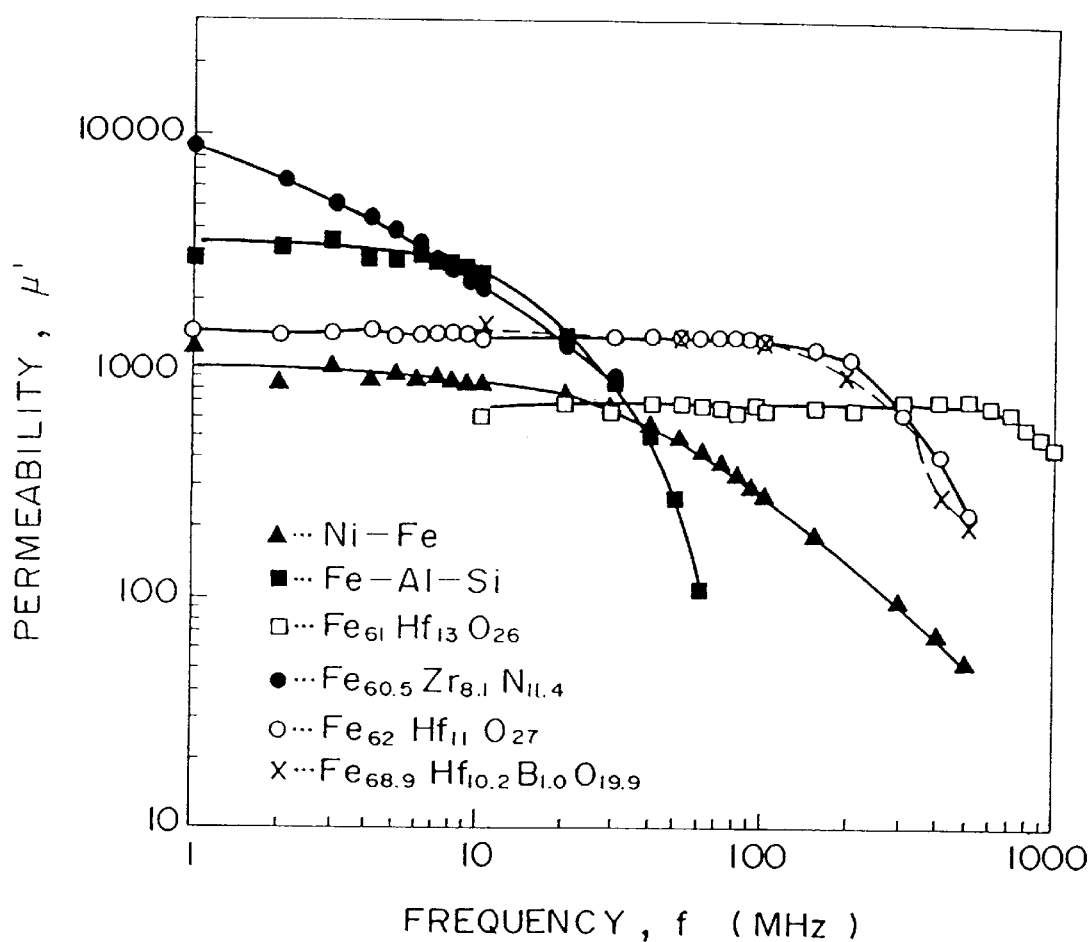
FIG. 13 is a graph showing the relation of frequency and initial magnetic permeability of each of an Ni—Fe alloy, an Fe—Al—Si alloy, an $Fe_{80.5}Zr_{8.1}N_{11.4}$ alloy, an $Fe_{61}Hf_{13}O_{26}$ alloy, an $Fe_{82}Hf_{11}O_{27}$ alloy, and an $Fe_{68.9}Zr_{10.2}B_{1.0}O_{19.9}$ alloy.

As shown in FIG. 13, the Ni—Fe alloy, the Fe—Al—Si alloy and the $Fe_{80.5}Zr_{8.1}N_{11.4}$ alloy maintain an initial magnetic permeability $\mu'$ of about 1000 at a frequency of 1 to about 30 MHz, but the Fe—Al—Si alloy and the $Fe_{80.5}Zr_{8.1}N_{11.4}$ alloy show a real number $\mu'$ of initial magnetic permeability of 100 or less at a frequency of about 100 MHz or more. Also the real number $\mu'$ of initial permeability of the Ni—Fe alloy is 100 or less at a frequency of about 300 MHz or more.

On the other hand, it is also found that the $Fe_{62}Hf_{11}O_{27}$ alloy and the $Fe_{68.9}Hf_{10.2}B_{1.0}O_{19.9}$ alloy maintain an initial magnetic permeability $\mu'$ of 1000 or more even at a frequency of 100 MHz or more.

It is further found that the $Fe_{61}Hf_{13}O_{26}$ alloy maintains an initial magnetic permeability $\mu'$ of about 500 to 800 with less deterioration in initial magnetic permeability even if the frequency is increased.

This is possibly due to the fact that all the $Fe_{61}Hf_{13}O_{26}$ alloy, the $Fe_{62}Hf_{11}O_{27}$ alloy and the $Fe_{68.9}Hf_{10.2}B_{1.0}O_{19.9}$ alloy have high resistivity and thus hardly produce an eddy current even if the recording frequency is increased, and high initial magnetic permeability can thus be maintained even if the frequency is increased.

The degree of initial magnetic permeability is related to the shielding function, and as the initial magnetic permeability increases, the shielding function is improved, and the MR film can be shielded from recording noise.

Therefore, when the lower core layer 7 having both the core function and the shielding function is made of the $Fe_{61}Hf13O_{26}$ alloy, the $Fe_{62}Hf_{11}O_{27}$ alloy or the $Fe_{68.9}Hf_{10.2}B_{1.0}O_{19.9}$ alloy, the shielding function of the lower core layer 7 can be improved. Further, since the $Fe_{61}Hf13O_{26}$ alloy, the $Fe_{62}Hf_{11}O_{27}$ alloy and the $Fe_{68.9}Hf_{10.2}B_{1.0}O_{19.9}$ alloy have properties including a high saturation magnetic flux density, low coercive force and high resistivity, as shown in the ternary diagrams of FIGS. 7 and 8, the core function can also be improved.

Next, three types of thin film magnetic heads were manufactured in which the lower core layer 7 and the upper core layer 10 was made of an Ni—Fe alloy, an $Fe_{62}Hf_{11}O_{27}$ alloy or an $Ni_{48}Fe_{50.5}Mo_{1.5}$ alloy (all numerical values are by atomic %), and the frequency and overwrite performance (O.W. performance) of each of the thin film magnetic heads were measured. The O.W. performance represents the reproduced output value after recording data has been recorded on the different recording data recorded on the recording medium. When the reproduced output value of the first recorded data is lower, and the recorded data superposed on the first recorded data is higher, the O.W. performance is good.

Figure 14:
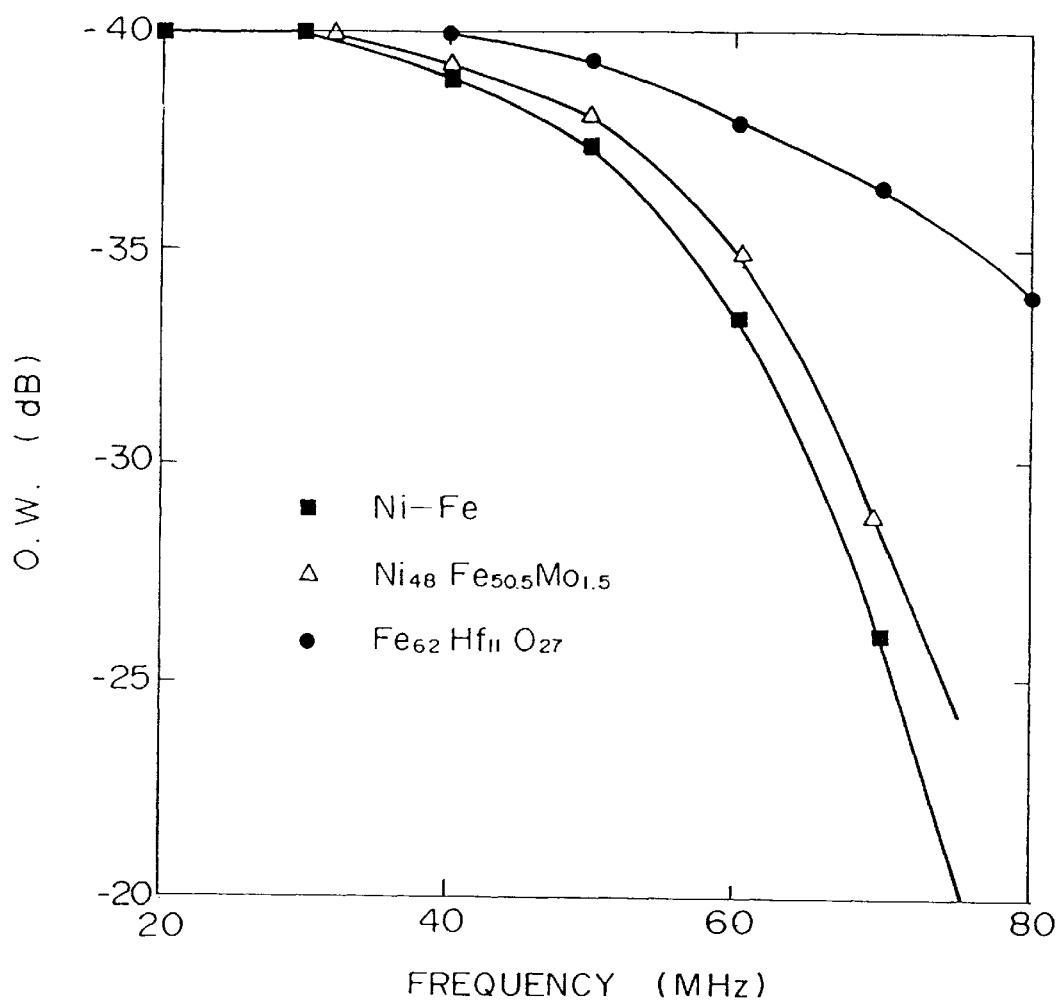
FIG. 14 is a graph showing the relation of frequency and overwrite performance (dB) of each of three types of thin film magnetic heads in which a lower core layer and an upper core layer are made of an Ni—Fe alloy, an $Fe_{62}Hf_{11}O_{27}$ alloy or an $Ni_{48}Fe_{50.5}Mo_{1.5}$ alloy.

FIG. 14 is a graph showing the relation between the frequency and O.W. performance with respect to the Ni—Fe alloy, the $Fe62Hf_{11}O_{27}$ alloy or an $Ni_{48}Fe_{50.5}Mo_{1.5}$ alloy.

FIG. 14 indicates that with all the Ni—Fe alloy, the $Fe_{62}Hf_{11}O_{27}$ alloy or an $Ni_{48}Fe_{50.5}Mo_{1.5}$ alloy, as the frequency increases, the O.W. performance deteriorates. However, as the frequency increases, the O.W. performance of the Ni—Fe alloy among the three types of soft magnetic materials most deteriorates, the $Ni_{48}Fe_{50.5}Mo_{1.5}$ alloy is the second, and the O.W. performance of the $Fe_{62}Hf_{11}O_{27}$ alloy deteriorates least.

It is also found that the composition ratio (Fe:Hf:O)= (62:11:27) of the Fe—Hf—O alloy used in the experiment shown in FIG. 14 is in the shadowed region (I) shown in the ternary diagram of FIG. 7. The shadowed region (I) is in a composition range which can be used for both the lower core layer 7 and the upper core layer 10. However, it is thought from the experimental results that by using the Fe—Hf—O alloy wherein the composition ratio is appropriately adjusted for the lower core layer 7 and the upper core layer 10, good O.W. performance can be obtained eve n if the recording frequency is increased.

As described above, the present invention enables a soft magnetic material having a high saturation magnetic flux density, low coercive force and high resistivity to be used for the upper core layer by appropriately adjusting the composition ratio of an Fe—M—O alloy, an Fe—M—T—O alloy or an Ni—Fe—X alloy, a soft magnetic material having a lower saturation magnetic flux density than the upper core layer, low coercive force and high resistivity to be used for the lower core layer, and a soft magnetic material having a low magnetostriction constant in addition to the above properties to be used for cases wherein the lower core layer has both the core function and the shielding function.

Therefore, in the present invention, since each of the lower core layer and the upper core layer can be formed of a soft magnetic material having high resistivity, even if the recording frequency is increased, an eddy current hardly occurs.

Also the saturation magnetic flux density of the lower core layer is lower than that of the upper core layer so that magnetization reversal of the leakage magnetic field between the lower core layer and the upper core layer easily takes place.

Further, even when the lower core layer has both the core function and the shielding function, the shielding function of the lower core layer is improved by decreasing the magnetostriction constant and coercive force of the lower core layer, and the MR layer can precisely be shielded from recording noise.

Also, in the present invention, since no step portion is formed at both side ends of the shielding layer formed on the gap layer, the coil layer can stably be formed, changes in the thickness of the non-magnetic material layer formed on the shielding layer can be decreased, and the occurrence of pin holes can be prevented.

The present invention also permits the formation of the shielding layer by the sputtering method or the like, and can widen the selectivity of the soft magnetic material used for the shielding layer. For example, when the shielding layer has both the core function and the shielding function, the writing frequency can be increased by forming the shielding layer using a soft magnetic material having a high saturation magnetic flux density, low coercive force and high resistivity.

What is claimed is:

1. A combination thin film magnetic head comprising a reading head having a magnetoresistive element layer, an inductive head composed of a coil layer and an upper core layer and laminated on said reading head, and a shielding layer formed on the magnetoresistive element layer with an insulation layer therebetween, wherein the shielding layer is formed to have a central portion having a uniform thickness of a width equal to or greater than the width of the upper core layer, and that the thickness of the layer then decreases gradually towards both ends.

2. A combination thin film magnetic head according to claim 1, wherein when said shielding layer functions both as a core of said inductive head and an upper shielding layer of said reading head, at least one of said shielding layer and an upper core layer opposed to said shielding layer with a magnetic gap therebetween contains Fe as a main component, as well as O and at least one element selected from the rare earth elements, Al, Si, Ti, Zr, Hf, V, Nb, Ta, W and Mg.

3. A combination thin film magnetic head according to claim 1, wherein when said shielding layer has functions both as a core of said inductive head and an upper shielding layer of said reading head, at least one of said shielding layer and an upper core layer opposed to said shielding layer with a magnetic gap therebetween contains Fe as a main component, as well as O, either of the elements B or C, and at least one element selected from the rare earth elements, Al, Si, Ti, Zr, Hf, V, Nb, Ta, W and Mg.

4. A combination thin film magnetic head according to claim 1, wherein an anti-milling layer made of a non-magnetic material is formed on either side of said shielding layer.

5. A combination thin film magnetic head according to claim 4, wherein the milling rate of the material used for forming the anti-milling layer is lower than that of the material used for said shielding layer.

6. A read head comprising:
   a magnetoresistive element layer;
   an upper shielding layer provided on the magnetoresistive element layer; and
   a lower shielding layer provided under the magnetoresistive element layer, the upper shielding layer and the lower shielding layer being separated from the magnetoresistive element layer by insulating layers therebetween;

wherein the lower shielding layer has a uniform thickness at least in a portion overlaid by the magnetoresistive element layer, and the thickness of the lower shielding layer decreases toward both ends of the lower shielding layer.

7. The read head according to claim 6, wherein the upper shielding layer has a uniform thickness at least in a portion lying on the magnetoresistive element layer, and the thickness of the layer then decreases toward both ends of the upper shielding layer.

8. The read head according to claim 6, wherein the lower shielding layer comprises a Ni—Fe—X alloy, wherein X is at least one element selected from the group of elements consisting of Nb, Mo, and S.

9. The read head according to claim 6, wherein the lower shielding layer comprises a Co-based amorphous alloy.

10. The read head according to claim 9, wherein the Co-based amorphous alloy is at least one of a Co—Zr—Nb alloy and a Co—Hf—Ta alloy.

11. A thin-film magnetic head comprising:

a read head including a magnetoresistive layer and an inductive head provided on the read head, the inductive head including a coil layer and a core layer;

the magnetoresistive layer being provided with an upper shielding layer and a lower shielding layer, each separated from the magnetoresistive layer by an insulating layer;

the core layer lying on a gap layer provided on the upper shielding layer;

wherein the upper shielding layer has a uniform thickness at least in a portion lying on the magnetoresistive layer, the width of the portion having the uniform thickness is larger than the width of the core layer, and the thickness of the upper shielding layer then decreases toward both ends thereof.

12. The thin-film magnetic head according to claim 11, wherein the lower shielding layer has a uniform thickness at least in a portion lying under the magnetoresistive layer, and the thickness of the lower shielding layer then decreases toward both ends thereof.

13. The thin-film magnetic head according to claim 11, wherein the core layer has a uniform thickness, and the thickness of the core layer then decreases toward both ends thereof.

14. The thin-film magnetic head according to claim 11, wherein the lower shielding layer comprises a Ni—Fe—X alloy, wherein X is at least one element selected from the group of elements consisting of Nb, Mo, and S.

15. The thin-film magnetic head according to claim 11, wherein the lower shielding layer comprises a Co-based amorphous alloy.

16. The thin-film magnetic head according to claim 15, wherein the Co-based amorphous alloy is at least one of a Co—Zr—Nb alloy and a Co—Hf—Ta alloy.

* * * * *

UNITED STATES PATENT AND TRADEMARK OFFICE
CERTIFICATE OF CORRECTION

PATENT NO.    : 6,346,338 B1
DATED         : February 12, 2002
INVENTOR(S)   : Toshinori Watanabe et al.

It is certified that error appears in the above-identified patent and that said Letters Patent is hereby corrected as shown below:

<u>Column 28,</u>
Line 46, delete "has" before "functions".

Signed and Sealed this

Fifteenth Day of October, 2002

*Attest:*

*Attesting Officer*

JAMES E. ROGAN
*Director of the United States Patent and Trademark Office*